United States Patent
Wiebe et al.

(10) Patent No.: US 10,990,677 B2
(45) Date of Patent: Apr. 27, 2021

(54) ADVERSARIAL QUANTUM MACHINE LEARNING

(71) Applicant: Microsoft Technology Licensing, LLC, Redmond, WA (US)

(72) Inventors: Nathan O. Wiebe, Redmond, WA (US); Ram Shankar Siva Kumar, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 15/624,651

(22) Filed: Jun. 15, 2017

(65) Prior Publication Data
US 2018/0349605 A1    Dec. 6, 2018

Related U.S. Application Data

(60) Provisional application No. 62/515,511, filed on Jun. 5, 2017.

(51) Int. Cl.
| | |
|---|---|
| *G06F 21/55* | (2013.01) |
| *G06F 21/56* | (2013.01) |
| *G06N 10/00* | (2019.01) |
| *G06N 20/00* | (2019.01) |
| *G06N 3/08* | (2006.01) |
| *G06N 3/04* | (2006.01) |
| *G06N 3/06* | (2006.01) |
| *G06N 20/20* | (2019.01) |

(52) U.S. Cl.
CPC ......... *G06F 21/566* (2013.01); *G06N 3/0454* (2013.01); *G06N 3/06* (2013.01); *G06N 3/08* (2013.01); *G06N 10/00* (2019.01); *G06N 20/00* (2019.01); *G06N 20/20* (2019.01)

(58) Field of Classification Search
CPC ..... G06F 21/55; G06F 21/553; G06F 2221/03
See application file for complete search history.

(56) References Cited

U.S. PATENT DOCUMENTS 5,440,723 A * 8/1995 Arnold ................. G06F 21/564
714/2
5,852,819 A * 12/1998 Beller ..................... G06F 16/20
(Continued)

OTHER PUBLICATIONS

"Qbit—Wikipedia", printed Jun. 6, 2020, 9 pages. (Year: 2020).*
(Continued)

*Primary Examiner* — Ponnoreay Pich
(74) *Attorney, Agent, or Firm* — Klarquist Sparkman, LLP

(57) ABSTRACT

In this disclosure, a number of ways that quantum information can be used to help make quantum classifiers more secure or private are disclosed. In particular embodiments, a form of robust principal component analysis is disclosed that can tolerate noise intentionally introduced to a quantum training set. Under some circumstances, this algorithm can provide an exponential speedup relative to other methods. Also disclosed is an example quantum approach for bagging and boosting that can use quantum superposition over the classifiers or splits of the training set to aggregate over many more models than would be possible classically. Further, example forms of k-means clustering are disclosed that can be used to prevent even a powerful adversary from even learning whether a participant even contributed data to the clustering algorithm.

18 Claims, 12 Drawing Sheets

(56) References Cited

U.S. PATENT DOCUMENTS

| | | | | |
|---|---|---|---|---|
| 6,473,876 B1* | 10/2002 | Kondo | H04N 19/89 | 375/E7.205 |
| 7,085,780 B2* | 8/2006 | Sakamoto | G06F 21/55 | |
| 7,448,084 B1* | 11/2008 | Apap | G06F 21/552 | 726/24 |
| 2005/0251570 A1* | 11/2005 | Heasman | G06F 21/55 | 709/224 |
| 2006/0085854 A1* | 4/2006 | Agrawal | G06F 21/552 | 726/23 |
| 2006/0161592 A1* | 7/2006 | Ertoz | G06F 21/552 | |
| 2006/0179029 A1* | 8/2006 | Vala | G06N 10/00 | 706/62 |
| 2006/0191010 A1* | 8/2006 | Benjamin | G06F 21/552 | 726/23 |
| 2008/0262990 A1* | 10/2008 | Kapoor | G06F 9/505 | 706/20 |
| 2009/0079494 A1* | 3/2009 | Kerner | G11C 11/44 | 327/528 |
| 2009/0193293 A1* | 7/2009 | Stolfo | G06F 21/564 | 714/26 |
| 2011/0041179 A1* | 2/2011 | St Hlberg | G06F 21/566 | 726/23 |
| 2011/0271146 A1* | 11/2011 | Mork | G06F 16/2453 | 714/37 |
| 2013/0111019 A1* | 5/2013 | Tjew | H04L 43/045 | 709/224 |
| 2013/0254885 A1* | 9/2013 | Devost | G06F 21/56 | 726/23 |
| 2014/0223555 A1* | 8/2014 | Sanz Hernando | G06F 21/55 | 726/22 |
| 2014/0303453 A1* | 10/2014 | Seely | G06F 17/18 | 600/301 |
| 2015/0006443 A1* | 1/2015 | Rose | G06K 9/6249 | 706/12 |
| 2016/0163186 A1* | 6/2016 | Davidson | G06Q 50/16 | 340/506 |
| 2016/0292588 A1* | 10/2016 | Burkot | G06F 9/30101 | |
| 2016/0314406 A1 | 10/2016 | Wiebe et al. | | |
| 2016/0338075 A1* | 11/2016 | McKibben | H04W 16/02 | |
| 2017/0364796 A1 | 12/2017 | Wiebe et al. | | |

OTHER PUBLICATIONS

Wiriyathammabhum et al, "Robust Principal Component Analysis Using Statistical Estimators", 6 pages. (Year: 2009).*

Buhrman et al, "Security of Quantum Bit String Commitment Depends on the Information Measure", 4 pages. (Year: 2006).*

Aïmeur et al., "Quantum Clustering Algorithms," *Int'l Conf. on Machine Learning*, 8 pp. (Jun. 2007).

Arrighi et al., "Blind quantum computation," *Int'l Journal of Quantum Information*, vol. 4, No. 05, pp. 883-898 (2006).

Berry et al., "Exponential improvement in precision for simulating sparse Hamiltonians," *ACM Symp. on Theory of Computing*, pp. 283-292 (May 2014).

Brassard et al., "Quantum Amplitude Amplification and Estimation," *Contemporary Mathematics*, vol. 305, pp. 53-74 (2002).

Broadbent et al., "Universal blind quantum computation," *IEEE Symp. Foundations of Computer Science*, pp. 517-526 (Dec. 2009).

Fuchs et al., "Cryptographic distinguishability measures for measures for quantum-mechanical states," *IEEE Trans. on Information Theory*, vol. 45, No. 4, pp. 1216-1227 (May 1999).

Hillery et al., "Towards quantum-based privacy and voting," *Physics Letters A*, vol. 349, pp. 75-81 (2006).

Lloyd et al., "Quantum principal component analysis," *Nature Physics*, 9 pp. (Sep. 2013).

Neven et al., "QBoost: Large Scale Classifier Training with Adiabatic Quantum Optimization," *JMLR: Workshop and Conf. Proc.*, vol. 25, pp. 333-348 (2012).

Nielsen et al., *Quantum Computation and Quantum Information*, Cambridge University Press, pp. 1-698 (2002).

Pudenz et al., "Quantum adiabatic machine learning," arXiv:1109.0325v1, 21 pp. (Sep. 2011).

Rebentrost et al., "Quantum support vector machine for big data classification," *Phys. Rev. Letters*, 5 pp. (Jul. 2014).

Schuld et al., "Quantum ensembles of quantum classifiers," arXiv:1704.02146v1, 19 pp. (Apr. 2017).

Wiebe et al., "Quantum Nearest-Neighbor Algorithms for Machine Learning," *Quantum Information & Computation*, 23 pp. (Jan. 2014).

* cited by examiner

ADVERSARIAL QUANTUM MACHINE LEARNING

CROSS REFERENCE TO RELATED APPLICATIONS

This application claims the benefit of U.S. Provisional Application No. 62/515,511 entitled "ADVERSARIAL QUANTUM MACHINE LEARNING" and filed on Jun. 5, 2017, which is hereby incorporated herein in its entirety.

FIELD

This application concerns quantum computing. In particular, this application concerns machine learning in computing devices.

SUMMARY

Security for machine learning has begun to become a serious issue for present day applications. In the quantum computing environment, the security of machine learning is still an unaddressed question. In this disclosure, a number of ways that quantum information can be used to help make quantum classifiers more secure or private are disclosed. In particular embodiments, a form of robust principal component analysis is disclosed that can tolerate noise intentionally introduced to a quantum training set. Under some circumstances, this algorithm can provide an exponential speedup relative to other methods. Also disclosed is an example quantum approach for bagging and boosting that can use quantum superposition over the classifiers or splits of the training set to aggregate over many more models than would be possible classically. Further, example forms of k means clustering are disclosed that can be used to prevent even a powerful adversary from even learning whether a participant even contributed data to the clustering algorithm.

These examples show the role that quantum technologies can play in the security of machine learning and further show that quantum technologies can provide useful advantages to machine learning apart from speedups.

Existing approaches to quantum machine learning provide performance advantages, but do not provide security advantages. Embodiments of the approaches disclosed here provide both. In particular, in example embodiments disclosed herein, a form of robust principal component analysis is shown that can resist adversaries meddling with the data set to affect the principal components. Quantum solutions to this problem exist, but can be easily defeated by adversaries. Example methods are also shown for quantum bagging and boosting, which can be used to limit the effect of adversaries who control parts of the data set and can also improve the accuracy of training.

Also shown herein are new forms of quantum clustering that can keep the data of the participants in the clustering algorithm secret even in the presence of an all powerful adversary.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

DETAILED DESCRIPTION

I. General Considerations

Figure 1:
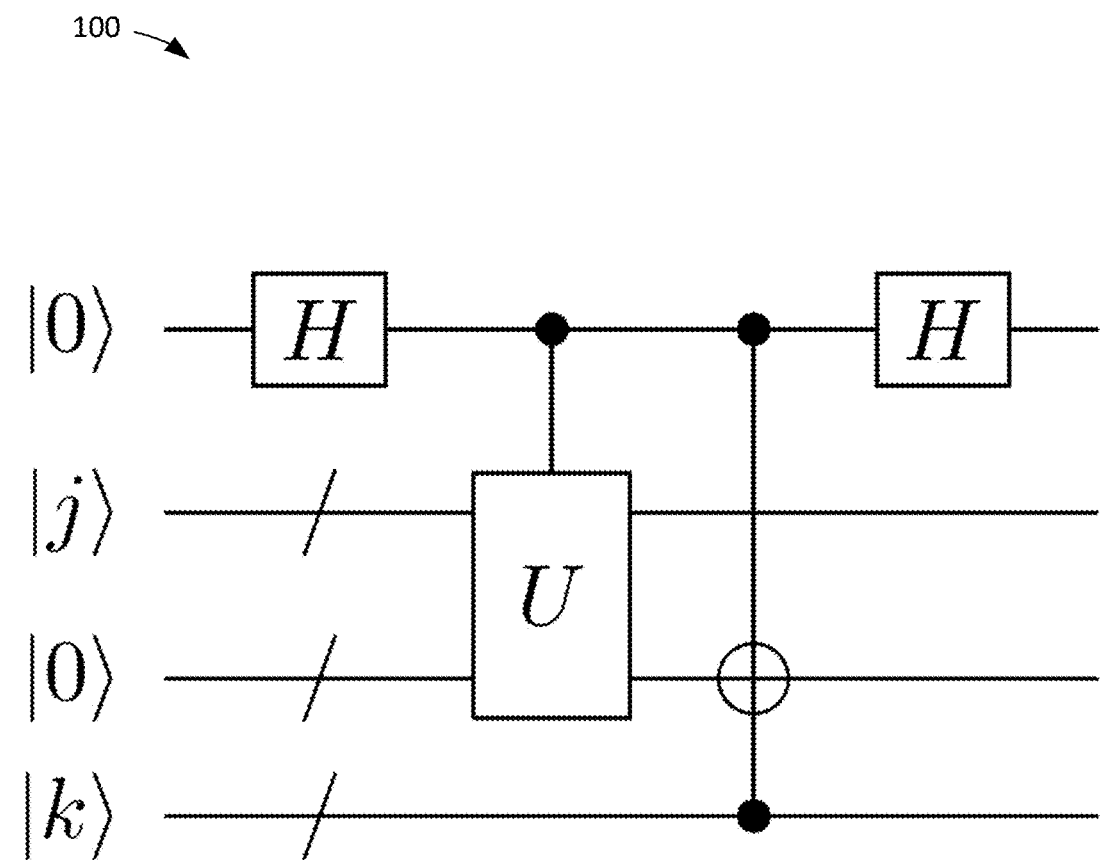
FIG. 1 illustrates an example circuit that can estimate the inner product $(v_j|k)$ using a single query to controlled U.

As used in this application, the singular forms a, an, and the include the plural forms unless the context clearly dictates otherwise. Additionally, the term includes means comprises. Further, as used herein, the term and/or means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like produce and provide to describe the disclosed methods. These terms are high-level abstractions of the actual operations that are performed. The actual operations that correspond to these terms will vary depending on the particular implementation and are readily discernible by one of ordinary skill in the art.

II. Introduction

There has been a significant uptick in the use of machine learning for industrial applications from self driving cars to detecting malignant tumors to detecting fraudulent credit card transactions.

More generally, machine learning is becoming more and more significant in various forms of decision making. However, classical machine learning algorithms such as principal component analysis (used heavily in anomaly detection scenarios), clustering (used in unsupervised learning), support vector machines (used in classification scenarios), as commonly implemented, are extremely vulnerable to changes to the input data, features and the final model parameters/hyper-parameters that have been learned. Essentially, an attacker can exploit any of the above vulnerabilities and subvert machine learning algorithms. As a result, an attacker has a variety of goals that can be achieved: increasing the false negative rate and thus become undetected (for instance, in the case of spam, junk emails are classified as normal) or by increasing the false positive rate (for instance, in the case of intrusion detection systems, attacks get drowned in sea of noise which causes the system to shift the baseline activity), steal the underlying model itself exploiting membership queries and even recover the underlying training data breaching privacy contracts.

This subject can be referred to as adversarial machine learning and has seen increased interest, largely applied to security sensitive areas such as intrusion detection and spam filtering. Quantum computing has also experienced a similar surge of interest recently. Further, there exists a synergistic relationship wherein quantum computers have been found to have profound implications for machine learning and machine learning. However, as of late, the question of what quantum computers can do to protect machine learning from adversaries is undeveloped.

In this disclosure, various mechanisms for securing quantum-based machine learning tools and techniques are disclosed. In particular, a robust form of quantum principal component analysis is disclosed that provides exponential speedups while making the learning protocol much less sensitive to noise introduced by an adversary into the training set. Example bagging and boosting for quantum computing are also disclosed. These techniques can be used to make models harder to extract by adversaries and also serve to make better classifiers by combining the predictions of weak classifiers. Also disclosed herein are approaches, to blind quantum computing, quantum key distribution, and quantum clustering.

III. Example Adversarial Quantum Machine Learning Techniques

As machine learning becomes more ubiquitous in applications so too do attacks on the learning algorithms that they are based on. The assumption usually made in machine learning is that the training data is independent of the model and the training process. For tasks such as the classification of images, such assumptions are reasonable because the user has complete control of the data. For other applications, such as developing spam filters or intrusion detection, this may not be reasonable because in such cases training data is provided in real time to the classifier and the agents that provide the information are likely to be aware of the fact that their actions are being used to inform a model.

Perhaps one of the most notable examples of this is the Tay chat bot incident. Tay was a chat bot that was released to a public chat room and was designed to lean from the users. Since the bot was programmed to learn from human interactions it could be subjected to what is known as a wolf pack attack, wherein a group of users in the chat room collaborated to purposefully change Tay's speech patterns to become increasingly offensive. After 16 hours the bot was pulled from the chat room.

Adversarial machine learning attempts to characterize and address such problems by making classifiers more robust to such attacks or by giving better tools for identifying when such an attack is taking place. There are several broad classes of attacks that can be considered, but perhaps the two most significant in the taxonomy in attacks against classifiers are exploratory attacks and causative attacks. Exploratory attacks are not designed to explicitly impact the classifier but instead are intended to give an adversary information about the classifier. Such attacks work by the adversary feeding test examples to the classifier and then inferring information about it from the classes (or meta data) returned. The simplest such attack is known as an evasion attack, which aims to find test vectors that when fed into a classifier get misclassified in a way that benefits the adversary (such as spam being misclassified as ordinary email). More sophisticated exploratory attacks may even try identify to the model used to assign the class labels or in extreme cases may even try identify the training set for the classifier. Such attacks can be deployed as a precursor to causative attacks or can simply be used to violate privacy assumptions that the users that supplied data to train the classifier may have had.

Causative attacks are more akin to the Tay example. The goal of such attacks is to change the model by providing it with training examples. Again there is a broad taxonomy of causative attacks but one of the most ubiquitous attacks is the poisoning attack. A poisoning attack seeks to control a classifier by introducing malicious training data into the training set so that the adversary can force an incorrect classification for a subset of test vectors. One particularly pernicious type of attack is the boiling frog attack, wherein the amount of malicious data introduced in the training set is slowly increased over time. This makes it much harder to identify whether the model has been compromised by users because the impact of the attack, although substantial, is hard to notice on the timescale of days.

While a laundry list of attacks are known against machine learning systems the defenses that have been developed thus far are somewhat limited. A commonly used tactic is to replace classifiers with robust versions of the same classifier. For example, consider k-means classification. Such classifiers are not necessarily robust because the intra-cluster variance is used to decide the quality of a clustering. This means that an adversary can provide a small number of training vectors with large norm that can radically impact the cluster assignment. On the other hand, if robust statistics such as the median, are used then the impact that the poisoned data can have on the cluster centroids is substantially reduced (e.g., minimal). Similarly, bagging can also be used to address these problems by replacing a singular classifier that is trained on the entire training set with an ensemble of classifiers that are trained on subsets of the training set. By aggregating over the class labels returned by this process, one can similarly limit the impact of an adversary that controls a small fraction of the data set.

Given such examples, two natural questions arise: 1) "How should one model threats in a quantum domain?" and 2) "Can quantum computing be used to make machine learning protocols more secure?". In order to address the former problem, it is useful to consider the access model used for the training data for the quantum machine learning algorithm. Perhaps the simplest model to consider is a QRAM wherein the training data is accessed using a binary access tree that allows, in depth $O(n)$ but size $O(2^n)$, the training data to be accessed as bit strings. For example, up to isometries, $U_{QRAM}|j\rangle|0\rangle = |j\rangle|[v_j]\rangle$ where $[v_j]$ is a qubit string used to encode the $j^{th}$ training vector. Similarly such an oracle can be used to implement a second type of oracle which outputs the vector as a quantum state vector (the issue of non-unit norm training is addressed in examples below): $U|j\rangle|0\rangle = |j\rangle|v_j\rangle$. Alternatively, one can consider a density matrix query for use in an LMR algorithm wherein a query to the training data takes the form $B|0\rangle \mapsto \rho$ where $\rho$ is a density operator that is equivalent the distribution over training vectors. For example, if one has a uniform distribution over training vectors in a training set of N training vectors, then $\rho = \sum_{j=1}^{N} |v_j\rangle\langle v_j|/(Tr\sum_{j=1}^{N} |v_j\rangle\langle v_j|)$.

With such quantum access models defined, one can now consider what it means to perform a quantum poisoning attack. A poisoning attack involves an adversary purposefully altering a portion of the training data in the classical case so in the quantum case it can be defined similarly. In this spirit, a quantum poisoning attack takes some fraction of the training vectors, $\eta$, and replaces them with training vectors of their choosing. That is to say, if without loss of generality an adversary replaces the first $\eta N$ training vectors in the data set then the new oracle that the algorithm is provided is of the form $$U_{QRAM}|j\rangle|0\rangle = \begin{cases} |j\rangle|[v_j]\rangle, & \text{if } j > \eta N \\ |j\rangle|[\phi_j]\rangle, & \text{otherwise} \end{cases} \quad (1)$$

where $|[\phi_j]\rangle$ is a bit string of the adversary's choice. Such attacks are reasonable if a QRAM is stored on an untrusted machine that the adversary has partial access to, or alternatively if the data provided to the QRAM is partially under the adversary's control. The case where the queries provide training vectors, rather than qubit vectors, is exactly the same. The case of a poisoning attack on density matrix input is much more subtle, however in such a case, the poisoning attack can be defined to take the form $B|0\rangle = \rho'$: $|Tr(\rho - \rho')| \leq \eta$, however other definitions are possible.

Such an example is a quantum causative attack since it seeks to cause a change in the quantum classifier. An example of a quantum exploratory attack could be an attack that tries to identify the training data or the model used in the classification process. For example, consider a quantum nearest neighbor classifier. Such classifiers search through a large database of training examples in order to find the closest training example to a test vector that is input. By repeatedly querying the classifier using quantum training examples adversarially chosen it is possible to find the decision boundaries between the classes aid from this even the raw training data can, to some extent, be extracted. Alternatively one could consider cases where an adversary has access to the network on which a quantum learning protocol is being carried out and seeks to learn compromising information about data that is being provided for the training process, which may be anonymized at a later stage in the algorithm.

Quantum can help, to some extent, both of these issues. Poisoning attacks can be addressed by building robust classifiers. That is, classifiers that are insensitive to changes in individual vectors. In this disclosure, it is shown that quantum technologies can help with this by illustrating how quantum principal component analysis and quantum bootstrap aggregation can be used to make the decisions more robust to poisoning attacks by proposing new variants of these algorithms that are amenable to fast quantum algorithms for medians to be inserted in the place of the expectation values typically used in such cases. Illustrations of how ideas from quantum communication can be used to thwart exploratory attacks are also disclosed by proposing a private version of k-means clustering that allows the protocol to be performed without (substantially) compromising the private data of any participants and also without requiring that the individual running the experiment be authenticated.

IV. Robust Quantum PCA

The idea behind principal component analysis can be explained as follows. Imagine you have a training set composed of a large number of vectors that live in a high dimensional space. However, often even high dimensional data can have an effective low-dimensional approximation. Finding such representations in general is a fine art, but quantum principal component analysis provides a prescriptive way of doing this. The idea of principal component analysis is to examine the eigenvectors of the covariance matrix for the data set. These eigenvectors are the principal components, which give the directions of greatest and least variance, and their eigenvalues give the magnitude of the variation. By transforming the feature space to this eigenbasis and then projecting out the components with small eigenvalues, one can reduce the dimensionality of the feature space.

One common use for this, outside of feature compression, is to detect anomalies in training sets for supervised machine learning algorithms. Imagine that you are the administrator of a network and you wish to determine whether your network has been compromised by an attacker. One way to detect an intrusion is to look at the packets moving through the network and use principal component analysis to determine whether the traffic patterns are anomalous based on previous logs. The detection of an anomalous result can be performed automatically by projecting the traffic patterns onto the principal components of the traffic data. If the data is consistent with this data it should have high overlap with the eigenvectors with large eigenvalue, and if it is not then it should have high overlap with the small eigenvectors.

While this technique can be used in practice it can have a fatal flaw. The flaw is that an adversary can inject spikes of usage in directions that align with particular principal components of the classifier. This allows them to increase the variance of the traffic along principal components that can be used to detect their subsequent nefarious actions. Robust statistics can be used to help mitigate such attacks.

The way that it can be used to help make PCA secure is by replacing the mean with a statistic like the median. Because the median is insensitive to rare but intense events, an adversary needs to control much more of the traffic flowing through the system in order to fool a classifier built to detect them. For this reason, switching to robust PCA is a widely used tactic to making principal component analysis more secure.

To formalize this, the robust PCA matrix can be defined as follows.

Definition 1

Let $x_j : j=1: N$ be a set of real vectors and let $e_k : k=1, \ldots, M$ be basis vectors in the computational basis then one can define $M_{k,l} := \text{median}([e_k^T x_j - \text{median}(e_k^T x_j)][e_l^T x_j - \text{median}(e_l^T x_j)])$.

This is very similar to the PCA matrix where one can express as $\text{mean}([e_k^T x_j - \text{mean}(e_k^T x_j)][e_l^T x_j - \text{mean}(e_l^T x_j)])$.

In quantum algorithms, building in such robustness into the classifier is anything but easy. The challenge faced in doing so is that the standard approach to this uses the fact that quantum mechanical state operators can be viewed as a covariance matrix for a data set. By using this similarity in conjunction with the quantum phase estimation algorithm, the method provides an expedient way to project onto the eigenvectors of the density operator and in turn the principal components. However, the robust PCA matrix given in 1 does not have such a natural quantum analogue. Moreover, the fact that quantum mechanics is inherently linear makes it more challenging to apply an operation like the median which is not a linear function of its inputs. This means that if one wants to use quantum PCA in an environment where an adversary controls a part of the data set, one must rethink the approach to quantum principal component analysis.

The challenges faced by directly applying density matrix exponentiation also suggests that one should consider quantum PCA within a different cost model than that usually used in quantum principal component analysis. Here, it is helpful to examine whether data obtained from a given source, which is modeled as a black box oracle, is typical of a well understood training set or not. Further, in some embodiments, the principal components of the vector are not of primary interest, but rather the focus is on their projection onto the low variance subspace of the training data. Further, in certain embodiments, it can be assumed that the training vectors are accessed in an oracular fashion and that nothing a priori is known about them.

Definition 2

Let U be a self-adjoint unitary operator acting on a finite dimensional Hilbert space such that $U|j\rangle|0\rangle = |j\rangle|v_j\rangle$ where $v_j$ is the $j^{th}$ training vector.

Lemma 1.

Let $x_j \in \mathbb{C}^N$ for integer j in [1, M] obey $\|x_j\| \leq R \in \mathbb{R}$. There exists a set of unit vectors in a Hilbert space of dimension $N(2M+1)$ such that for any $|x_j\rangle$, $|x_k^\dagger\rangle$ within this set $\langle x_j^\dagger | x_k \rangle = \langle x_j, x_k \rangle / R^2$.

Proof.

The proof is constructive. Assume that R>0. First, define for any $x_j$, $$|x_j/\|x_j\|\rangle := x_j/\|x_j\|. \qquad (2)$$

One can then encode $$x_j \mapsto |x_j\rangle := |x_j/\|x_j\|\rangle \left( \frac{\|x_j\|}{R} |0\rangle + \sqrt{1 - \frac{\|x_j\|^2}{R^2}} |j\rangle \right). \qquad (3)$$

$$x_j^\dagger \mapsto |x_j^\dagger\rangle := |x_j^\dagger/\|x_j\|\rangle \left( \frac{\|x_j\|}{R} |0\rangle + \sqrt{1 - \frac{\|x_j\|^2}{R^2}} |j+M\rangle \right).$$

If R=0 then $$x_j \mapsto |0\rangle|j\rangle,$$

$$x_j^\dagger \mapsto |0\rangle|j+M\rangle. \qquad (4)$$

It is then easy to verify that $\langle x_j^\dagger | x_k \rangle = \langle x_j, x_k \rangle / R^2$ for all pairs of j and k, even if R=0. The resultant vectors are defined on a tensor product of two vector spaces. The first is of dimension N and the second is of dimension at least 2M+1. Since the dimension of a tensor product of Hilbert spaces is the product of the subsystem dimensions, the dimension of the overall Hilbert space is N(2M+1) as claimed.

For the above reason, it can be assumed without loss of generality that all training vectors are unit vectors. Also, for simplicity, it will be assumed that $v_j \in \mathbb{R}$, but the complex case follows similarly and only differs in that both the real and imaginary components 1b the inner products need to be computed.

The goal in this example approach to robust PCA is to examine the eigendecomposition of a vector in terms of the principal components of M. This has a major advantage over standard PCA in that it is manifestly robust to outliers. It will be seen that, within this oracle query model, quantum approaches can provide great advantages for robust PCA if one assumes that M is sparse.

Now that an algorithm for coherently computing the median has been developed, one can apply this subroutine to compute the components of M. First, a method is developed to be able to compute a representation of $e_k^T x_j$ for any k and j.

Lemma 2.

For any k and j define $y_{k,j}$ such that $|y_{k,j} - e_k^T v_j| \leq \epsilon$ there exists a coherent quantum algorithm that maps $|k, j\rangle|0\rangle \mapsto |k, j\rangle(\sqrt{1-\lambda_{k,j}}|y_{k,j}\rangle + \sqrt{\lambda_{k,j}}|y_{k,j}^\perp\rangle)$ for $0 \leq \lambda_{k,j} \leq \Delta \leq 1$ that uses $O(\log(1/\Delta)/\epsilon)$ queries to control U.

Proof.

First, assume that all the $v_j$ are not unit vectors. Under such circumstances, one can use Lemma 1 to embed these vectors as unit vectors in a high dimensional space. Therefore, it can be assumed without loss of generality that $v_j$ are all unit vectors.

Since $v_j$ can be taken to be a unit vector, one can use quantum approaches to compute the inner product. Specifically, circuit 100 of FIG. 1 can estimate the inner product $\langle v_j | k \rangle$ using a single query to controlled U.

Specifically, the probability of measuring the top-most qubit is $$P(0|k, j) = \frac{1 + \langle k | v_j \rangle}{2}, \qquad (5)$$

where recall that it was assumed that the training vectors satisfy $|v_j\rangle \in \mathbb{R}$.

Following the argument for coherent amplitude estimation in Nathan Wiebe, Ashish Kapoor, and Krysta M Svore, "Quantum nearest-neighbor algorithms for machine learning" Quantum Information and Computation, 15 (2015), one can use this process to produce a circuit that maps $|k,j\rangle|0\rangle \mapsto |k, j\rangle(\sqrt{1-\lambda_{k,j}}|y_{k,j}\rangle+\sqrt{\lambda_{k,j}}|y_{k,j}^\perp\rangle$ for $0 \le \lambda_{k,j} \le \Delta \le 1$ using $O(\log(1/\Delta)/\epsilon)$ in-vocations of the above circuit. From this result, one can apply a reversible circuit to compute $\langle k|v_j\rangle=2P(0|k,j)-1$ as a qubit string. Since this map is invertible, one can then use this value to zero-out the register containing $y_{k,j}$ as a bit string. These steps require no queries. The result then follows from the fact that the circuit contains $O(1)$ queries to controlled U.

Theorem 1.

Let U be a unitary operation such $U|0\rangle|j\rangle=|0\rangle|j\rangle$ and $U|1\rangle|j\rangle=|1^1\rangle x_j\rangle$. Further let $|\mathcal{M}\rangle$ be a quantum state on a Hilbert space $\mathcal{H}_{junk} \otimes \mathcal{H}_M$ where the reduced density operator $\text{Tr}_{junk}(|\mathcal{M}\rangle\langle\mathbb{1}|)$ has support only over $\epsilon$-approximate medians for the probabilities $|\langle x_k|x_j\rangle|^2$. Specifically, $\langle y|\mathcal{M}\rangle \ne 0$ if the probability over j for fixed k satisfies $|P(|\langle x_k|x_j\rangle|^2 < y) - 1/2| \le \epsilon$. For $\delta \ge \delta' > 0$ a state can be coherently prepared of the form $$\sqrt{1-\delta}|\mathcal{M}\rangle + \delta'|\mathcal{M}^\perp\rangle;$$

using a number of queries to U that scales as $O(\epsilon^{-2} \log(1/\epsilon) \log(\log(1/\epsilon)/\delta))$.

Proof.

Consider the following algorithm
1. Prepare the state $|L_1\rangle|R_1\rangle$ such that $L_1$ corresponds to 0 and $R_1$ corresponds to 1.
2. Repeat steps 3 through 9 for p=1 to $p=p_{max} \in O(\log(1/\epsilon))$
3.

$$|L_p\rangle|R_p\rangle \to \frac{1}{\sqrt{N}}\sum_{j=1}^{N}|j\rangle|L_p\rangle|R_p\rangle|\mu_p\rangle|0\rangle|0\rangle \text{ for } \mu_p = ([L_p+R_p]/2).$$

4. Repeat the following step within a coherent amplitude estimation with error $\epsilon/3$ and error probability $\delta_0 \in O(\delta/\log(1/\epsilon))$ on the fifth register using a projector that marks all states in that register, $|\lambda_p\rangle$, such that $\lambda_p < \mu_p$, and store the probabilities in the sixth register.
5. Apply coherent amplitude estimation on the inner product circuit in Lemma 2 to prepare state $$\frac{1}{\sqrt{N}}\sum_{j=1}^{N}|j\rangle|L_p\rangle|R_p\rangle|\mu_p\rangle(\sqrt{1-\delta_p(j,k)}|\psi_p(j,k)\rangle + \sqrt{\delta_p(j,k)}|\psi_p^\perp(j,k)\rangle)|0\rangle,$$

where $\langle v|\psi_p(j,k)\rangle \ne 0$ if $||v-|\langle x_k|x_k\rangle|^2| \le \epsilon'$ and $\delta_p(j,k) \le \epsilon/3$.

6. Use a reversible circuit to set, conditioned on the probability computed in the above steps is less than $1/2-\epsilon/3$, $|L_{p+1}\rangle \leftarrow |\mu_p\rangle$ and $R_{p+1} \leftarrow |R_p\rangle$.
7. Use a reversible circuit to set, conditioned on the probability computed in the above steps is greater than $1/2+\epsilon/3$, $|R_{p+1}\rangle \leftarrow |\mu_p\rangle$ and $L_{p+1} \leftarrow |L_p\rangle$.
8. Use a reversible circuit to set, in all remaining cases, $|L_{p+1}\rangle \leftarrow |L_p\rangle$ and $|R_{p+1}\rangle \leftarrow |R_p\rangle$.
9. Revert. $|\mu_p\rangle$ to 0.

Using Lemma 2, one can compute the inner products within error $\epsilon'$ and error probability $\epsilon/3$ using $O(\log(1/\epsilon)/\epsilon')$ queries to U. Similarly the amplitude estimation routine on the probability requires $O(\log(1/\delta_0)/\epsilon)$ queries to the inner product calculation. The outer loop repeats this $O(\log(1/\epsilon))$ times which leads to complexity $$O\left(\frac{\log(1/\epsilon)\log(1/\delta_0)\log(1/\epsilon)}{\epsilon^2}\right) = O\left(\frac{\log^2(1/\epsilon)\log(\log(1/\epsilon)/\delta)}{\epsilon^2}\right). \quad (6)$$

Thus one can write the state that results from the innermost step as $$\frac{1}{\sqrt{N}}\sum_{j=1}^{N}|j\rangle|L_p\rangle|R_p\rangle|\mu_p\rangle(\sqrt{1-\epsilon/3}|\psi_p(j,k)\rangle+\sqrt{\epsilon/3}v_{error})|0\rangle \quad (7)$$

$$:= \frac{1}{\sqrt{N}}\sum_{j=1}^{N}|j\rangle$$

$$L_p\rangle|R_p\rangle|\mu_p\rangle|\tilde{\psi}_p(j,k)\rangle|0\rangle,$$

where $v_{error}$ is a vector of length at most 1, and is not necessarily orthogonal to the remaining portion.

Let U be the unitary circuit implemented by coherent amplitude estimation. Then the marking circuit for amplitude estimation is (up to a global phase) $\mathbb{1}-2P(x<\mu)$. The latter projector can be easily implemented using a comparator circuit and the phase kicked back. Since the entire process leading up to this is unitary, phase estimation can be used on top of the Grover oracle for marking the state. After applying coherent amplitude estimation to estimate the median of this state with error probability $\delta/\log(1/\epsilon)$ and error at most $\epsilon/3$ one can obtain a state of the form $$\sqrt{1-\delta/\log(1/\epsilon)|0\rangle}|L_p\rangle|R_p\rangle|\mu_p\rangle|0\rangle|P_p(k)\rangle +$$
$$\delta/\log(1/\epsilon)|P(k)^\perp\rangle, \quad (8)$$

where again $|P_p(k)\rangle$ has projection only on vectors that correctly estimate the probability that the bitstrings encoded in $|\tilde{\psi}_p(j, k)\rangle$ are less than $\mu$. The latter state vectors along with the j register are absent from the result because superpositions over these quantities is only transiently present during the application of the marking operator in the construction of the Grover oracle.

The error in the two estimation processes is at most $2\epsilon/3$ and the probability of failure, if the state were to be measured, would be $\delta/\log(1/\epsilon)$. The former point can be observed from the fact that the maximum error in the estimate of the marked amplitude is $\epsilon/3$, but the probability of obtaining data from a failure branch is $\epsilon/3$. The most, significant impact these failures can have occurs when failures (e.g., all failures) are either marked or unmarked. In such cases the total error in the estimate of the marked amplitude can be $2\epsilon/3$. Thus the protocol will, with probability $\delta/\log(1/\epsilon)$ determine the percentile that $\mu_p$ is in within error at most $2\epsilon/3$.

Finally, this process is repeated in a binary search process that determines whether the $\mu_p$ is located at a percentile within $1/2 \pm \epsilon/3$. This process requires $O(\log(1/\epsilon))$ repetitions to find such a percentile. Furthermore, conditioned on success of each estimate of the percentile, one can guarantee that on termination the bounds on the error in the percentile guarantee that the result is actually within $1/2 \pm \epsilon$. Thus the union bound predicts that, upon completion of the algorithm, the probability that at least one of these $O(\log(1/\epsilon))$ steps failed is $O(\delta)$. Thus the algorithm on success outputs an $\epsilon$-approximate median with probability $1-\epsilon$ as desired.

Because a substantial garbage cleanup is not performed in the above algorithm, the output results are entangled with the values of $L_p$, $R_p$ and the estimates of the percentiles for $\mu_p$ that appear as intermediates in the calculation. For this reason, and the fact that the failure probability is at most $\delta$, one can then write the resultant quantum state as $\sqrt{1-\delta'}|\mathcal{M}\rangle+\sqrt{\delta'}|\mathcal{M}^\perp\rangle$ for $|\mathcal{M}\rangle$ and $\mathcal{M}^\perp$ in the Hilbert space $\mathcal{H}_{junk} \otimes \mathcal{H}_M$, where the latter space encodes the estimate of the median.

Corollary 1.

An oracle that provides c approximate queries to $M_{k,l}$ can be implemented in the form of a unitary that maps $$U:|0\rangle \mapsto \sqrt{1-\delta'}|\mathcal{M}'\rangle+\delta'|\mathcal{M}'^\perp\rangle,$$

using a number of queries to U that scales as $O(\epsilon^{-2} \log(1/\epsilon) \log(\log(1/\epsilon)/\delta))$ where $|\mathcal{M}'\rangle$ j has projection only on encodings of $M_{k,l}$ up to $\epsilon$-error.

Proof.

The proof is a consequence of Theorem 1. In one example embodiment, the computation of the medians involves the following steps. First, it is desirable to compute the median for fixed k and the median for fixed l and then compute the median of the products of differences between these terms and the inner products. From Theorem 1 the number of queries to the vectors needed to estimate this is in $O(\epsilon^{-2} \log(1/\epsilon) \log(\log(1/\epsilon)/\delta))$ because the costs of both of these processes is additive. Because the inner products are bounded above by 1 the error from estimating the medians in the products of terms is $O(\epsilon)$. Thus the error from the computation of both medians sums to a value of $O(c)$ if $O(\epsilon^{-2} \log(1/\epsilon)\log(\log(1/\epsilon)/\delta))$ queries are used for each of the three procedures.

Now that it has been established that the cost of implementing an approximate query to the matrix M, a further step is to diagonalize the matrix in order to be able to find the support of an input vector within a subspace. For simplicity, it can be assumed in the following that the error tolerance for the median, $\epsilon$, required by the algorithms is constant. However, it will be assumed that the error tolerance required for the inner products, $\epsilon'$, is not a constant and will demand increased precision as the size of the problem grows. For this reason, existing methods that show that the errors in the unitary implementation translate into error in the eigenphase do not necessarily hold (as they would for Trotter-based methods). For this reason, it is desirable to explicitly demonstrate that phase estimation can be employed using this approach with finite error.

Before concluding with this theorem on robust, quantum PCA, there is one more technical lemma that should be proven. In particular, it is desirable to demonstrate that when using non-unitary simulation methods for $e^{-iM}$ that the errors that arise from the truncated Taylor simulation method do not invalidate the phase estimation protocol.

Lemma 3.

Let H be a self-adjoint matrix of constant sparsity with $\|H\|_{max}=1$ then a state $\sqrt{1-\delta'}|\mathcal{M}\rangle+\sqrt{\delta'}|\mathcal{M}\rangle$ where $|\mathcal{M}\rangle$ has support on $\epsilon$-approximate estimates of the eigenvalues of $e^{-iH}$ with $\delta' \leq \delta \leq 1$ using $$O\left(\frac{1}{\epsilon\delta}\log(1/\delta\epsilon)/\log\log(1/\delta\epsilon)\right)$$

queries to an oracle that gives the location of each non-zero matrix element in a given row of H and another that evaluates $H_{x,y}$ for any $(x, y)$.

Proof.

The truncated Taylor simulation result allows a non-unitary matrix W to be implemented such that $\|e^{-iH}-W\|_2 \leq \epsilon'$ for any $\epsilon'>0$. The cost of this process for fixed sparsity is, $O(\|H\|_{max} \log(1/\epsilon')/\log \log(1/\epsilon'))$. Additionally, $\|W\| \leq 1+\epsilon'$. Let r be the number of times that the simulation circuit is applied and assume $(1+\epsilon')^r \leq 2$. It is now desirable to show that $$\|e^{iHr}-W^r\| \leq (2r-1)\epsilon. \tag{9}$$

The proof can be inductive. For $r=1$ it trivially holds from the results on the truncated Taylor series simulation algorithm. Now assume as the induction step that $\|e^{iHp}-W^p\| \leq (2p-1)\epsilon$. One then has that for $p \in [1, r-1]$ $$\|e^{-iH(p+1)}-W^{p+1}\|=\|e^{-iH}(e^{-iHp}-W)+(e^{-iH}-W)W^p\| \leq (2p-1)\epsilon'+\epsilon'(1+\epsilon')^p. \tag{10}$$

Since $p \leq r$, $(1+\epsilon')^p \leq (1+\epsilon')^r \leq 2$. It then follows that.

$$\|e^{-iH(p+1)}-W^{p+1}\| \leq (2p+1)\epsilon', \tag{11}$$

which demonstrates the induction step.

To ensure that the failure probability from the phase estimation and the simulation add to $\delta$, assume that both are bounded above by $\delta/2$. Thus, it is desirable for $\epsilon' \leq \delta/(4r-2)$ which is automatically satisfied if $\epsilon' \leq \delta/4r$. The assumption that $(1-\epsilon')^r \leq 2$ then reduces to $(1+\delta/4r)^r \leq 2$. This is further implied by $e^{\delta/4} \leq 2$ which holds if $\delta < 4 \ln 2$ and is further implied by $\delta \leq 1$ as assumed in the lemma statement.

The QFT-based phase estimation circuit requires $r \in O(1/\delta\epsilon)$ to achieve error c in the eigenvalue estimation and $\delta$ in the failure probability. This implies that if $U_{PE}$ is the ideal phase estimation circuit and $\tilde{U}_{PE}$ is the circuit that arises from the Taylor series method then $$\|U_{PE}-\tilde{U}_{PE}\| \in O(\epsilon'/(\epsilon\delta)). \tag{12}$$

Thus if one wishes $\tilde{U}_{PE}|\psi\rangle-U_{PE}|\psi\rangle=\delta v$, for vector v of length at most 1 then it suffices to choose $\epsilon' \in O(\delta^2\epsilon)$. Hence the cost of simulating each $e^{-iH}$ in terms of queries to the Hamiltonian oracles is $O(\log(1/\epsilon\delta)/\log\log(1/\epsilon\delta))$. Note that $\log(1/\epsilon\delta^2) \in \theta(\log(1/\epsilon\delta))$. The result then follows from the fact that this simulation is repeated $O(1/\epsilon\delta)$ times, and the state output from phase estimation matches the required form in the lemma.

Now, the pieces can be put together to prove the theorem that shows that under some circumstances a quantum computer can perform robust PCA using a polynomial number of oracle calls.

Theorem 2.

Then the number of oracle calls needed to sample from the eigenvalues of d-sparse matrix M using an oracle that outputs the matrix elements of M, encoded in a quantum state of the form $\sqrt{1-\delta'}|\mathcal{M}\rangle+\sqrt{\delta'}|\mathcal{M}^\perp\rangle$ for $\delta>\delta' \geq 0$. If one requires error at most $\kappa$ in certain estimates of the eigenvalues and demand a probability of failure for the algorithm of at most $\Delta$ then the number of queries to the underlying training data is in $$\tilde{O}\left(\frac{d^4}{\kappa^3\Delta}\right).$$

where $f \in \tilde{O}(F)$ if there exists a polylogarithmic function g, such as $g=\log(1/\delta)$, such that $f/g \in O(F)$.

Proof.

This can be achieved through phase estimation. First, it can be noted that the cost as a function of the success probability is poly-logarithmic in δ. Thus one can ignore the cost of making the failure probability arbitrarily small since such costs disappear in the $\tilde{O}(\cdot)$. Phase estimation requires simulating quantum evolution for time $\tilde{O}(1/\Delta\kappa)$ to estimate an eigenphase within error κ with probability at least 1−Δ [?]. Note that in other applications where the eigenvalue of a single eigenstate is estimated, the scaling with the probability of success is poly-logarithmic because of the ability to use the Chernoff bound to amplify the probability. Since here the aim is to project onto a principal component, of which there may be exponentially many, one cannot use the bound to guarantee success. Therefore one can only guarantee success using conventional phase estimation by estimating more bits.

An ideal oracle that provides t-approximate answers to the matrix elements of M is defined here and denoted $M_{id}$. Now if M is the actual matrix one queries and uses the result of (Corollary 1 to access these matrix elements, then one knows there exists $M_e$ such that the sparsity pattern of $M_e$ matches that of M and $\|M_e\|_{max} \le \epsilon$. Since each query to M generates a distinct deviation, one can envision M as a time-dependent Hamiltonian where each call made sequentially gives a different value of the matrix elements.

Next it is desirable to show that $|M_{id}-M\| \le (d-2)\epsilon$. This can be seen using the following argument. Since M is d-sparse and Hermitian the off-diagonal elements of M can be viewed as the adjacency matrix of a graph with degree at most d. Vizing's theorem states that at most d+1 colors are needed to color this graph. Since each matrix element in an adjacency matrix corresponds to an edge in the graph, this implies that the off-diagonal elements in M can be decomposed into a sum of d+1 one-sparse matrices. Since the diagonal elements of M trivially form a one-sparse matrix M can be decomposed into d+2 one-sparse matrices. Thus, one can write $M=\sum_{j=1}^{d+2} M^{(j)}$ where each $M^{(j)}$ is one-sparse. One can then use the triangle inequality to write $$\| M - M_{id} \| \le (d+2) \max_j \| M_e^{(j)} \|, \quad (13)$$

where $M_e^{(j)} = M^{(j)} - M_{id}^{(j)}$.

The next step is to show that $$\max_j \| M_e^{(j)} \| \le \epsilon. \quad (14)$$

First note that if a matrix is one-sparse, it consists of the direct sum of one and two-dimensional subspaces. Thus there exists a complete eigenbasis of the matrix such that each eigenvector $|E_{j,k}\rangle$ is supported only on one of these irreducible one or two-dimensional spaces. Assume that $M_e^{(j)}|E_{j,k}\rangle = E_{j,k}|E_{j,k}\rangle$ and $|E_{j,k}\rangle$ is an irreducible one-dimensional subspace. Then because $\|M_e^{(j)}\|_{max} \le \epsilon$ it follows that $|E_{j,k}| \le \epsilon$. Now assume that the vector lies within a two-dimensional irreducible subspace. After an appropriate re-labeling of the rows and columns of the matrix, one can express the action of $M_e^{(j)}$ on this space as $$\begin{pmatrix} 0 & \alpha \\ \alpha^* & 0 \end{pmatrix}.$$

Here because $\|M_e^{(j)}\|_{max} \le \epsilon$ one has that $|\alpha| \le \epsilon$ and hence $|E_{j,k}| \le \epsilon$. Which demonstrates the claim from the definition of the induced 2-norm.

Now combining Eq. (13) with Eq. (14) yields $$\|M-M_{id}\| \le (d+2)\epsilon. \quad (15)$$

When performing a simulation, a difficulty arises when using the randomized oracles disclosed herein because even subsequent calls with the same inputs are not guaranteed to yield equivalent results when $\epsilon > 0$. Consider the truncated Taylor series method of simulation, where one can truncate at order K and define M(p) to be the $p^{th}$ covariance matrix queried. It is easy to see from an inductive argument and (15) that if $\|M(j)\| \le 2\|M_{id}\|$ for all j then $$\| M^p - \prod_{j=1}^{p} M(j) \| \le 3^{p-1} \| M_{id} \|^{p-1} \max_j \| M_{id} - M(j) \| \le 3^{p-1} \| M_{id} \|^{p-1} (d+2)\epsilon. \quad (16)$$

From the assumption that $(d+2)\epsilon \le \|M_{id}\|$ and $\|M(j)\| \le 2\|M_{id}\|$ one then finds from Eq. (15) that $$\| \sum_{p=0}^{K} \frac{(-it/r)^p (M_{id}^p - \prod_{j=1}^{p} M^{(j)})}{p!} \| \quad (17)$$

$$- \sum_{p=1}^{K} \frac{(t/r)^p 3^{p-1} \| M_{id} \|^{p-1} (d+2)\epsilon}{p!} \le \frac{(d+2)\epsilon (e^{3\|M_{id}\|t/r}-1)}{3\|M_{id}\|}.$$

The variable r is picked such that $r \ge 3\|M_{id}\|t/2$. Thus it follows from Taylor expanding Eq. (17) that $$\frac{(d+2)\epsilon(e^{3\|M_{id}\|t/r}-1)}{3\|M_{id}\|} \in O(d\epsilon t/r). \quad (18)$$

Specifically, given the choice that $r \in \Theta(d^2\|M_{id}\|_{max}t) \subseteq \Theta(d^2 t)$ given the maximum value of the covariance matrix is 1 in the problem. Now from the triangle inequality, one can see that the error in a single segment in the truncated Taylor-series simulation is bounded above by $$\| e^{-iM_{id}t/r} - \sum_{p=0}^{K} \frac{(-it/r)^p M_{id}^p}{p!} \| \quad (19)$$

$$+ \| \sum_{p=0}^{K} \frac{(-it/r)^p M^p}{p!} - \sum_{p=0}^{K} \frac{(-it/r)^p \prod_{j=1}^{p} M(j)}{p!} \|.$$

Thus if $$\| e^{-iM_{id}t/r} - \sum_{p=0}^{K} \frac{(-it/r)^p \prod_{j=1}^{p} M_{id}^{(j)}}{p!} \| \le \epsilon_s/r$$

then performing the truncated Taylor series simulation implies that one is performing an $(\epsilon_s + d\epsilon t)/r$ approximation to the controlled unitary needed. This matches the requirements of Lemma 6 of [?] and so robust oblivious amplitude amplification can be used here and hence the Taylor series simulation method can be used here.

There are two types errors in this simulation. First the errors from the truncated Taylor series expansion and second the errors from the evaluation of the matrix elements of M. The former error can be made arbitrarily small at the price of logarithmic overhead, which disappears in the $\tilde{O}(\bullet)$. The latter error in a single segment is $O(d\epsilon t/r)$. This gives the maximum error that one can see in the eigenvalues of the segment. However, the error in the eigenvalues of $e^{-iM_{id}t/r}$ is less interesting than the eigenvalues of $M_{id}$. The error in those eigenvalues is $O(\epsilon d)$. Thus if one desires error $\kappa$ in estimate of the eigenvalues, $\epsilon \in \Theta(\kappa/d)$ suffices.

The overall cost of the example algorithm disclosed above is given by applying phase estimation on a segment using Lemmas 3, which leads to logarithmic overheads that disappear in the $\tilde{O}$ notation. The number of queries to the data needed by Corollary 1 is $\tilde{O}(d^2/[\epsilon^2 \kappa \Delta])$, which evaluates to $\tilde{O}(d^4/[\kappa^3 \Delta])$ queries.

This shows that, under the assumptions of sparsity, one can efficiently sample from the eigenvalues in the support of an input vector under the assumptions that M is sparse. From these samples, one can determine with a poly-logarithmic number of repetitions whether the median eigenvalue is above or below a threshold from the Chernoff bound. This allows one to apply robust quantum PCA to identify whether a training example is likely to be anomalous given a partially corrupted training set. The ability to do this using exponentially fewer queries shows that quantum computers can, at least in oracular settings, provide significant advantages for thwarting attacks adversaries may make against the quantum oracle.

V. Bootstrap Aggregation

Bootstrap Aggregation, otherwise known as bagging, is another approach that can be used to increase the security of machine learning as well as improve the quality of the decision boundaries of the classifier. The idea behind bagging is to replace a single classifier with an ensemble of classifiers. This ensemble of classifiers is constructed by randomly choosing portions of the data set to feed to each classifier. One way of doing this is bootstrap aggregation, wherein the training vectors are chosen randomly with replacement from the original training set. Since each vector is chosen with replacement, with high probability each training set will exclude a constant fraction of the training examples. This can make the resultant classifiers more robust to outliers and also make it more challenging for an adversary to steal the model.

While the concept of a classifier has a clear meaning in classical computing, applying the same ideas to quantum classifiers creates certain challenges. The first such challenge lies with the encoding of the training vectors. In classical machine learning training vectors are typically bit vectors. For example, a binary classifier can then be thought of as a map from the space of test vectors to $\{-1, 1\}$ corresponding to the two classes. This is if C were a classifier then $Cv = \pm v$ for all vectors v depending on the membership of the vector. Thus every training vector can be viewed as an eigenvector with eigenvalue $\pm 1$. This is illustrated for unit vectors in Figure ??.

Now imagine that the test vector is a quantum state $|\psi\rangle$ in $\mathbb{C}^2$. Unlike the classical setting, it may be physically impossible for the classifier to know precisely what $|\psi\rangle$ is because measurement inherently damages the state. This makes the classification task fundamentally different than it is in classical settings where the test vector is known in its entirety. Since such vectors live in a two-dimensional vector space and they comprise an infinite set, not all $|\psi\rangle$ can be eigenvectors of the classifier C. However, if one lets C be a classifier that has eigenvalue $\pm 1$ one can always express $|\psi\rangle = a|\phi_+\rangle + \sqrt{1-|a|^2}|\phi_-\rangle$, where $C|\phi_\pm\rangle = \pm|\phi_\pm\rangle$. Thus one can still classify in the same manner, but now one desirably measures the state repeatedly to determine whether $|\psi\rangle$ has more projection onto the positive or negative eigenspace of the classifier. This notion of classification is a generalization of the classical idea and highlights the importance of thinking about the eigenspaces of a classifier within a quantum framework.

Certain example approaches to boosting and bagging disclosed herein embrace this idea. The idea is to combine an ensemble of classifiers to form a weighted sum of classifiers $C = \Sigma_j b_j C_j$ where $b_j > 0$ and $\Sigma_j b_j = 1$. Let $|\phi\rangle$ be a simultaneous $+1$ eigenvector of each $C_j$, ie $C_j|\phi\rangle = |\phi\rangle$ $$C|\phi\rangle = \sum_j b_j C_j |\phi\rangle = |\phi\rangle. \quad (20)$$

The same obviously holds for any $|\phi\rangle$ that is a negative eigenvector of each $C_j$. That is, any vector that is in the simultaneous positive or negative eigenspace of each classifier will be deterministically classified by C.

Figure 2:
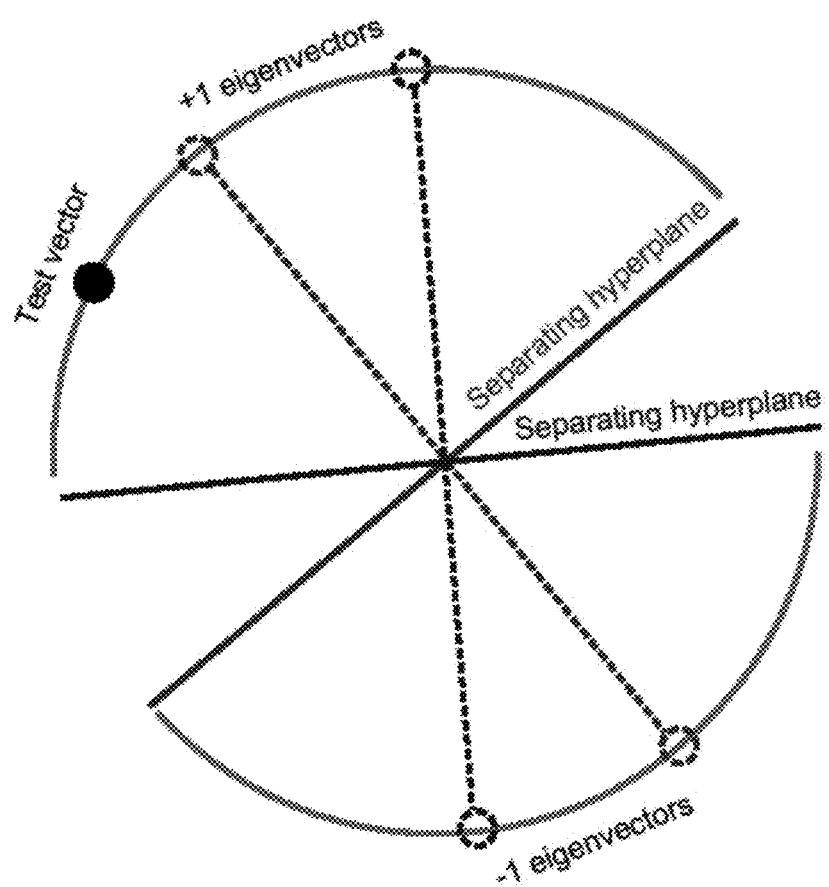
FIG. 2 is a block diagram showing eigenspaces for two possible linear classifiers for linearly separated unit vectors.

FIG. 2 illustrates this concept. In particular, FIG. 2 is a diagram 200 showing eigenspaces for two possible linear classifiers for linearly separated unit vectors. Each trained model provides a different separating hyperplane and eigenvectors. Bagging aggregates over the projections of the test vector onto these eigenvectors and outputs a class based on that aggregation.

One way to construct a classifier out of an ensemble of classifiers is to project the test vector onto the eigenvectors of the sum of the classifiers and compute the projection of the state into the positive and negative eigenvalue subspaces of the classifier. This gives an additional freedom not observed in classical machine learning. While the positive and negative eigenspaces are typically fixed for each classifier in the classical analogues of a classifier, here they are not. Also, it is desirable for an algorithm to function for states that are fed in a streaming fashion. That is to say, it is not desirable to assume that when a state $|\psi\rangle$ is provided that one can prepare a second copy of this state. This prevents one from straight forwardly measuring the expectation of each of the constituent $C_j$ to obtain a classification for $|\psi\rangle$. It also prevents one from using quantum state tomography to learn $|\psi\rangle$ and then applying a classifier on it. A formal definition of this form of quantum boosting or bagging is provided below.

Definition 3

Two-class quantum boosting or bagging is defined to be a process by which an unknown test vector is classified by projecting it onto the eigenspace of $C = \Sigma_j b_j C_j$ and using the sign of the eigenvalue or the projection of the vector onto the positive or negative eigenspace to assign its class. Here each $C_j$ is unitary with eigenvalue $\pm 1$, $\Sigma_j b_j = 1$, $b_j \geq 0$, and at least two $b_j$ that correspond to distinct $C_j$ are positive.

One can realize such a classifier via phase estimation. But before discussing this, it is desirable to abstract the input to the problem for generality. This can be done by assuming that each classifier, $C_j$, being included is specified only by a weight vector $w_j$. If the individual classifiers were neural networks then the weights could correspond to edge and bias weights for the different neural networks that one would find by training on different subsets of the data. Alternatively, if one were forming a committee of neural networks of different structures then one can simply envision taking the register used to store $w_j$ to be of the form [tag, $w_j$] where the tag tells the system which classifier to use. This allows the same data structure to be used for arbitrary classifiers.

These ideas can be formalized in a quantum setting by introducing quantum blackboxes, $\mathcal{T}$, $\mathcal{B}$ and C. The first takes an index and outputs the corresponding weight vector. The second prepares the weights for the different classifiers in the ensemble C. The final blackbox applies, programmed via the weight vector, the classifier on the data vector in question. Example embodiments of these black boxes can be defined as below.

Definition 4

Let C be a unitary operator such that if $|w\rangle \in \mathbb{C}^{2n_w}$ represents the weights that specify the classifier $C|w\rangle|\psi\rangle = |w\rangle C(w)|\psi\rangle$ for any state $|\psi\rangle$. Let $\tau$ be a unitary operator that, up to local isometries performs $\tau|j\rangle = |j\rangle|w_j\rangle$, which is to say that it generates the weights for classifier j (potentially via training on a subset of the data). Finally, define unitary $B:B|0\rangle = \Sigma_j \sqrt{b_j}|j\rangle$ for non-negative $b_j$ that sum to 1.

In order to apply phase estimation on C, for a fixed and unknown input vector, $|\psi\rangle$, one is desirably able to simulate $e^{-iCt}$. Fortunately, because each $C_j$ has eigenvalue $\pm 1$ it is easy to see that $C_j^2 = 1$ and hence is Hermitian. Thus C is a Hamiltonian. One can therefore apply Hamiltonian simulation ideas to implement this operator and formally demonstrate this with the following lemma.

Lemma 4.

Let $C = \Sigma_{j=1}^M b_j C_j$ where each $C_j$ is Hermitian and unitary and has a corresponding weight vector $w_j$ for $b_j \geq 0 \forall j$ and $\Sigma_j b_j = 1$. Then for every $\epsilon > 0$ and $t \geq 0$ there exists a protocol for implementing a non-unitary operator, W, such that for all $|\psi\rangle \| e^{-iCt}|\psi\rangle - W|\psi\rangle\| \leq \epsilon$ using a number of queries to C, B and $\tau$ that is in $O(t \log(t/\epsilon)/\log \log(t/\epsilon))$.

Proof.

The proof follows from the truncated Taylor series simulation algorithm. By definition $B|0\rangle = \Sigma_j \sqrt{b_j}|j\rangle$. Now consider the operation select(V):=$\tau^\dagger C \tau$. This operation has the effect that, up to isometries, $C|j\rangle|\psi\rangle = |j\rangle C_j|\psi\rangle$. The operations select(V) and B take the exact same form as their analogues in the Taylor-series simulation algorithm. If $T = \Sigma_j |b_j| t$ then the Taylor series simulation algorithm requires an expansion up to order $K \in O(\log(T/\epsilon)/\log \log(T/\epsilon))$ and the use of robust oblivious amplitude estimation requires r such segments where $r \in O(T)$. Thus the total number of queries to select(V) made in the simulation is $O(Kr) = O(T \log(T/\epsilon)/\log \log(T/\epsilon)$, and the number of queries to B in the algorithm is $O(r) \subseteq O(T)$.

Next, by assumption, one has that $\Sigma_j b_j = 1$ and therefore $T = t$. Thus the number of queries to select(V) and B in the algorithm is in $O(t \log(t/\epsilon)/\log \log(t/\epsilon))$. The result then follows after noting that a single call to select(V) requires O(1) calls to V and C.

Note that in general purpose simulation algorithms, the application of select(V) will require a complex series of controls to execute; whereas here the classifier is made programmable via the $\mathcal{T}$ oracle and so the procedure does not explicitly depend on the number of terms in C (although in practice it will often depend on it through the cost of implementing $\mathcal{T}$ as a circuit). For this reason the query complexity cited above can be deceptive if used as a surrogate for the time-complexity in a given computational model.

With the result of Lemma 4, one can now proceed to finding the cost of performing two-class bagging or boosting where the eigenvalue of C is used to perform the classification. One example claim is given below.

Theorem 3.

Under the assumptions of Lemma 4, the number of queries needed to C, B and $\mathcal{T}$ to project $|\psi\rangle$ onto an eigenvector of C with probability at least $1-\delta$ and estimate the eigenvalue within error $\epsilon$ is in $$O\left(\left(\frac{1}{\delta\epsilon}\right) \log(1/\epsilon)/\log \log(1/\epsilon)\right).$$

Proof.

Since $\|C\| \leq 1$, it follows that one can apply phase estimation on the $e^{-iC}$ in order to project the unknown state $|\psi\rangle$ onto an eigenvector. The number of applications of $e^{-iC}$ needed to achieve this within accuracy $\epsilon$ and error $\delta$ is $O(1/\delta\epsilon)$ from Lemma 3. Therefore, after taking t=1 and using the result of Lemma 4 to simulate $e^{-iC}$ that the overall query complexity for the simulation is in $$O\left(\left(\frac{1}{\delta\epsilon}\right) \log(1/\epsilon)/\log \log(1/\epsilon)\right).$$

VI. Quantum Enhanced Privacy for Clustering

Since privacy is one of the major applications of quantum technologies, it should come as no surprise that quantum computing can help boost privacy in machine learning as well. As an example, a discussion of how quantum computing can be used to allow k-means clustering to be performed without leaking substantial information about any of the training vectors will be provided.

The k-means clustering algorithm is perhaps the most ubiquitous algorithm used to cluster data. While there are several variants of the algorithm, the most common variant attempts to break up a data set into k clusters such that the sum of the intra-cluster variances is minimized. In particular, let f: $(x_j, \{\mu\}) \mapsto (1, \ldots, k)$ gives the index of the set of centroids $\{\mu\} = \{\mu_1, \ldots, \mu_k\}$ and $x_j$ are the vectors in the data set. The k means clustering algorithm then seeks to minimize $\Sigma_j |x_j - \mu_{f(x_j, \{\mu\})}|_2^2$. Formally, this problem is NP hard which means that no efficient clustering algorithm (quantum or classical) is likely to exist. However, most clustering problems are not hard examples, which means that clustering generically is typically not prohibitively challenging.

The k-means algorithm for clustering can proceed as follows. First begin by assigning the $\mu_p$ to data points sampled at random. Then for each $x_j$ find the $\mu_p$ that is closest to it, and assign that vector to the $p^{th}$ cluster. Next set $\mu_1, \ldots, \mu_k$ to be the cluster centroids of each of the k clusters and repeat the previous steps until the cluster centroids converge.

A challenge in applying this algorithm to cases, such as clustering medical data, is that the individual performing the algorithm typically needs to have access to the users information. For sensitive data such as this, it is difficult to apply such methods to understand structure in medical data sets that are not already anonymized. Quantum mechanics can be used to address this.

Imagine a scenario where an experimenter wishes to collaboratively cluster a private data set. The experimenter is comfortable broadcasting information about the model to the N owners of the data, but the users are not comfortable leaking more than m bits of information about their private data in the process of clustering the data. The example approach, which is related to quantum voting strategies, is to share an entangled quantum state between the recipients and use this to anonymously learn the means of the data. See Mark Hillery, Mario Ziman, Vladimir Buzek, and Martina Bielikovaj, "Towards quantum-based privacy and voting," Physics Letters A, 349(1):75-81 (2006).

1. The experimenter broadcasts k cluster centroids over a public classical channel.
2. For each cluster centroid, $\mu_p$, the experimenter sends the participant one qubit out of the state $(|0\rangle^N+|1\rangle^N)/\sqrt{2}$.
3. Each participant that decides to contribute applies $e^{-iZ/2N}$ to the qubit corresponding to the cluster that is closest to their vector. If two clusters are equidistant, the closest, cluster is chosen randomly.
4. Experimenter repeats above two steps $O(1/\epsilon)$ times in a phase estimation protocol to learn $P(f(x_j, \{\mu\})=p)$ within error $\epsilon$. Note that because participants may not participate $\Sigma_{p=1}^k P(f(x_j, \{\mu\})=p) \leq 1$.
5. Next the experimenter performs the same procedure except phase estimation is now performed for each of the d components of $x_j$, a total of $O(d/\epsilon P(f(x_j)=p))$ for each cluster p.
6. From these values the experimenter updates the centroids and repeats the above steps until convergence or until the privacy of the users data can no longer be guaranteed.

Intuitively, the idea behind the above algorithm is that each time a participant interacts with their qubits they do so by performing a tiny rotation. These rotations are so small that individually they cannot be easily distinguished from performing no rotation, even when the best test permitted by quantum mechanics is used. However, collectively the rotation angles added by each participant sums to non-negligible rotation angle if a large number of participants are pooled. By encoding their private data as rotation angles, the experimenter can apply this trick to learn cluster means without learning more than a small fraction of a bit of information about any individual participant's private data.

Lemma 5.

Steps 1-5 of the above protocol take a set of d dimensional vectors $\{x_j: j=1, \ldots, N\}$ held by N potential participants and a set of cluster centroids $\{\mu_p: p=1, \ldots, k\}$ and computes an iteration of k-means clustering with the output cluster centroids computed within error $\epsilon$ in the infinity norm and each participant requires a number of single qubit rotations that scales as $O(d/[\min_p P(f(x_j, \{\mu\})=p)\epsilon])$ under the assumption that each participant follows the protocol precisely.

Proof.

Now consider the protocol from the perspective of the experimenter. From this perspective the participants' actions can be viewed collectively as enacting blackbox transformations that apply an appropriate phase on the state $(|0\rangle^N+|1\rangle^N)/\sqrt{2}$. Consider the first phase of the algorithm, corresponding to steps 2 and 3, where the experimenter attempts to learn the probabilities of users being in each of the k clusters.

First, when the cluster centroids are announced to participant j, they can then classically compute the distance $x_j$ and each of the cluster centroids efficiently. No quantum operations are needed to perform this step. Next for the qubit corresponding to cluster p user j performs a single qubit rotation and uses a swap operation to send that qubit to the experimenter. This requires O(1) quantum operations. The collective phase incurred on the state $(|0\rangle^N+|1\rangle^N)/\sqrt{2}$ from each such rotation results in (up to a global phase)

$$(|0\rangle^N+|1\rangle^N)/\sqrt{2} \mapsto \left(|0\rangle^N+e^{-i\sum_j \delta_{j(x_j,\{\mu\}),p}/N}|1\rangle^N\right)/\sqrt{2} = (|0\rangle^N+e^{-iP(f(x_j)=p)}|1\rangle^N)/\sqrt{2}.$$

It is then easy to see that after querying this black box t-times that the state obtained by them applying their rotation t times is $(|0\rangle^N+e^{-iP(f(x_j)=p)t}|1\rangle^N)/\sqrt{2}$. Upon receiving this, the experimenter performs a series of N controlled-not operations to reduce this state to $(|0\rangle+e^{-iP(f(x_j)=p)}|1\rangle)/\sqrt{2}$ up to local isometries. Then after applying a Hadamard transform the state can be expressed as $\cos(P(f(x_j)=p)t/2)|0\rangle+\sin(P(f(x_j)=p)t/2)|1\rangle$. Thus the probability of measuring this qubit to be 0 exactly matches that of phase estimation, wherein $P(f(x)=p)$ corresponds to the unknown phase. This inference problem is well understood and solutions exist such that if $\{t_q\}$ are the values used in the steps of the inference process then $\Sigma_q |t_q| \in O(1/\epsilon)$ if one wishes to estimate $P(f(x_j)=p)$ within error $\epsilon$.

While it may naively seem that the users require $O(k/\epsilon)$ rotations to perform this protocol, each user in fact only needs to perform $O(1/\epsilon)$ rotations. This is because each vector is assigned to only one cluster using the above protocol. Thus only $O(1/\epsilon)$ rotations are needed per participant.

In the next phase of the protocol, the experimentalist follows the same strategy to learn the means of the clustered data from each of the participants. In this case, however, the blackbox function is of the form $$(|0\rangle^N+|1\rangle^N)/\sqrt{2} \mapsto (|0\rangle^N+e^{-i\Sigma_j[x_j]_q\delta_{f(x_j),p}/N}|1\rangle^N)/\sqrt{2},$$

where $[x_j]_q$ is the $q^{th}$ component of the vector. By querying this black box t times and performing the exact same transformations used above, one can apply phase estimation to learn $\Sigma_j[x_j]_q\delta_{f(x_j),p}/N$ within error $\delta$ using $O(1/\delta)$ queries to the participants. Similarly, one can estimate $$\frac{\Sigma_j[x_j]_q\delta_{f(x_j),p}}{NP(f(x_j)=p)} = \frac{\Sigma_j[x_j]_q\delta_{f(x_j),p}}{\Sigma_j\delta_{f(x,j),p}}$$

within error $\epsilon$ using $O(1/[\epsilon P(f(x_j)=p)])$ querie if $P(f(x_j)=p)$ is known with no error.

If $P(f(x_j)=p)$ is known within error $\epsilon$ and $P(f(x_j)=p) > \epsilon$ then it is straight forward to see that $$\left| \frac{1}{P(f(x_j)=p)} - \frac{1}{P(f(x_j)=p)+\epsilon} \right| \in O(\epsilon).$$

Then because $$\frac{\Sigma_j [x_j]_q \delta_{f(x_j),p}}{N} \in O(1) \quad (5)$$

it the overall error is at most ε given the assumption that $\min_p P(f(x_j)=p) > \epsilon$. Each component of the centroid can therefore be learned using $O(1/[\min_p P(f(x_j)=p)\epsilon])$ rotations. Thus the total number of rotations that each user needs to contribute to provide information about their cluster centroid is $O(d/[\min_p P(f(x_j)=p)\epsilon])$.

While this lemma shows that the protocol is capable of updating the cluster centroids in a k means clustering protocol, it does not show that the users' data is kept secret. In particular, it is desirable to show that even if the experimenter is an all powerful adversary then they cannot even learn whether or not a user actually participated in the protocol. The proof of this is actually quite simple and is given in the following theorem.

Theorem 4.

Let B be a participant in a clustering task that repeats the above protocol R times where B has $x_j$ and let $\{\mu^{(\tau)}\}$ be the cluster centroids at round r of the clustering. Assume that the eavesdropper E assigns a prior probability that B participated in the above protocol to be ½ and wishes to determine whether B contributed $x_j$ (which may not be known to E) to the clustering. The maximum probability, over all quantum strategies, of E successfully deciding this is $½+O(Rd/[\min_{p,r} P(f(x_j, \{\mu^{(r)}\})=p)N\epsilon])$ if $\min_{p,r} P(f(x_j, \{\mu^{(r)}\})=p) > \epsilon$.

Proof.

The proof of the theorem proceeds as follows. Since B does not communicate classically to the experimenter, the only way that E can solve this problem is by feeding B an optimal state to learn B's data. Specifically, imagine E usurps the protocol and provides B a state ρ. This quantum state operator is chosen to maximize the information that E can learn about the state. The state ρ, for example, could be entangled over the multiple qubits that would be sent over the protocol and could also be mixed in general. When this state is passed to B a transformation $U\rho U^\dagger$ is enacted in the protocol. Formally, the task that E is faced with is then to distinguish between ρ and $U\rho U^\dagger$.

Fortunately, this state discrimination problem can be addressed. The optimal probability of correctly distinguishing the two, given a prior probability of ½, is $$P_{opt} = ½ + ¼ Tr|\rho - U\rho U^\dagger|. \quad (21)$$

Assume without loss of generality that B's $x_j$ is located in the first cluster. Then U takes the form $$U = (e^{-iZ/2N})^{\otimes q_1} \otimes (e^{-iZ/2N})^{\otimes q_2} \otimes 1 = \quad (22)$$

$$e^{-i\left[\sum_{p=1}^{q_1} Z^{(p)} + \sum_{r=q_1+1}^{q_1+q_2} Z^{(r)}\right]/2N} := e^{-iH/2H},$$

where 1 refers to the identity acting on the qubits used to learn data about clusters 2 through k (as well as any ancillary qubits that E chooses to use to process the bits) and $q_1$ and $q_2$ are the number of rotations used in the first and second phases discussed in Lemma 5. $Z^{(p)}$ refers to the Z gate applied to the $p^{th}$ qubit.

Using Hadamard's lemma and the fact that $Tr(|\rho A|) \le \|A\|_2$ for any density operator ρ one then sees that provided $(q_1+q_2) < N$ $$Tr\left|\rho - e^{-iH/2N}\rho e^{iH/2N}\right| = Tr\left|\frac{-i}{2N}[H, \rho] - \frac{1}{(2N)^2 2!}[H,[H,\rho]] + \cdots\right| \le \sum_{n=1}^{\infty} \frac{\|H\|_2^n}{N^n n!} \in O\left(\frac{q_1+q_2}{N}\right). \quad (23)$$

Let $\{\mu^{(r)}\}$ be the cluster centroids in round r of the R rounds. From Lemma 5 one can see that the number of rotations used in the R rounds of the first phase obeys $q_1 \in O(R/\epsilon)$ and the number of rotations in the R rounds of the second phase obeys $q_2 \in O(Rd/[\min_{p,r} P(f(x_j, \{\mu^{(r)}\})=p)\epsilon])$. Thus, from Eq. (23) that if $\min_{p,r} P(f(x_j, \{\mu^{(r)}\})=p) > \epsilon$ then $$|P_{opt} - 1/2| \in O\left(\frac{Rd}{\min_{p,r} P(f(x_j, \{\mu^{(r)}\})=p) N\epsilon}\right). \quad (24)$$

If the minimum probability of membership over all k clusters and R rounds obeys $$\min_{p,r} P(f(x_j, \{\rho^{(r)}\})=p) \in \Omega(1/k), \quad (25)$$

which is what is expected in typical cases, the probability of a malevolent experimenter discerning whether participant j contributed data to the clustering algorithm is $O(dk/N\epsilon)$. It then follows that if a total probability of ½+δ for the eavesdropper identifying whether the user partook in the algorithm can be tolerated then R rounds of clustering can be carried out if $$N \in \Omega\left(\frac{Rdk}{\epsilon\delta}\right).$$

This shows that if N is sufficiently large then this protocol for k-means clustering can be carried out without compromising the privacy of any of the participants.

One potential drawback of the above approach is that the scheme does not protect the model learned from the users. Such protocols could be enabled by only having the experimenter reveal hypothetical cluster centroids and then from the results infer the most likely cluster centroids, however this diverges from the k-means approach to clustering and will likely need a larger value of N to guarantee privacy given that the information from each round is unlikely to be as useful as it is in k-means clustering.

Also, while the scheme is private it is not secure. This can be seen from the fact that an eavesdropper could intercept a qubit and apply a random phase to it. Because the protocol assumes that the sum of the phases from each participant adds up to at most 1, this can ruin the information sent. While this approach is not secure against an all-powerful adversary, the impact that individual malfeasant participants could have in the protocol can be mitigated. One natural way is to divide the N participants into a constant number of smaller groups, and compute the median of the cluster centroids returned. While such strategies will be successful at thwarting a constant number of such attacks, finding more general secure and private quantum methods for clustering data remains an important goal for future work.

VII. General Embodiments

This section describes several example embodiments for programming and/or operating a quantum computing device in a secure and/or private manner as shown and described herein. The illustrated embodiment should not be construed as limiting, as the disclosed method acts can, in some cases, be performed alone, in different orders, or at least partially simultaneously with one another. Further, any of the disclosed methods or method acts can be performed with any other methods or method acts.

In some embodiments, the methods below are performed (entirely or at least in part) by a classical computer configured to communicate with and control a quantum computer. Still further, the method acts can be embodied as computer-executable instructions which when executed by a computer cause the computer to perform the methods.

Figure 3:
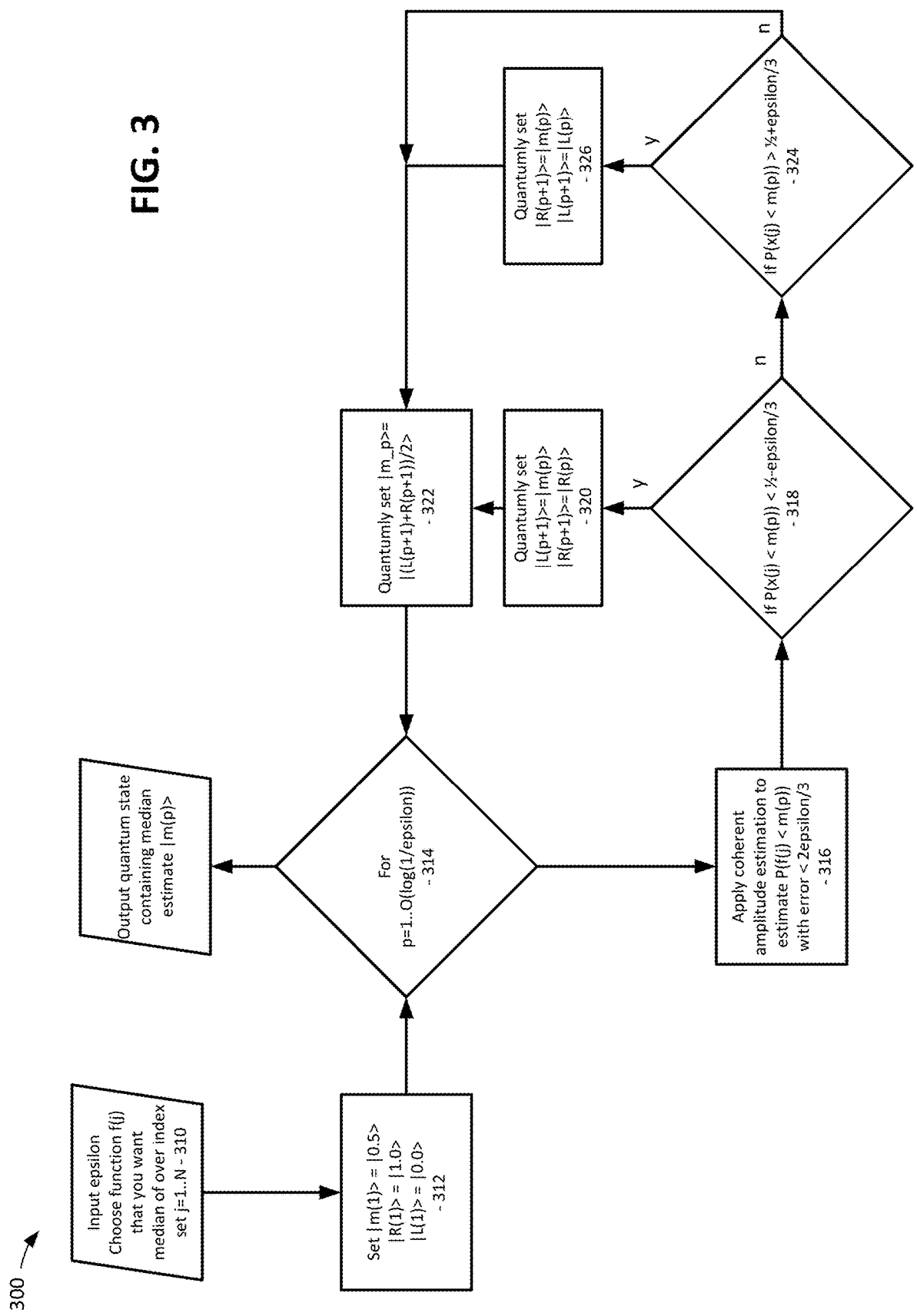
FIG. 3 is a flowchart showing an example method for coherent quantum median estimation.

FIG. 3 is a flowchart. 300 showing an example method for coherent quantum median estimation. In particular, FIG. 3 describes how to perform binary search to find a median for a data set based on a process that only outputs its result via the probability of success of an auxiliary method. Here the probability of success is $P(f(j) \, ; m(p))$ but the method is not restricted to such implementation. Unlike conventional binary search, the results are stored as quantum bit strings.

At 310, the inputs to the routine are received. In particular, the function for median is to be computed is input and the list of indices for the problem is initialized. At 312, the initial guess for the median is set as well as upper and lower limits on the median. At 314, an iterative procedure is initiated. In particular, the procedures 316-322 iterate over all of the rounds of the median estimation. Each of these rounds constitutes a binary search and hence $O(\log(1/\text{epsilon}))$ steps suffices for the algorithm to converge. At 316, the procedure learns whether the estimate of the median is an upper of a lower bound on the median within some fixed error tolerance. This is achieved by using coherent amplitude estimation, which allows the question of whether the current estimate of the median is an upper or lower bound on the true median using quadratically fewer samples than would be needed using non-quantum methods. At 318, the procedure decides whether the true median is below the estimated threshold within the error tolerance allowed. If it is deduced at 318 that the median is estimate is a lower bound on the true median, then at 320, the procedure updates the lower limit for the true median and keeps the upper limit fixed. At 322, the procedure update the current estimate of the median to be the mean of the updated upper and lower limits. In the event that the upper and lower limits were not altered in the previous iteration the median is kept the same. At 324, a determination is made as to whether the median is an upper bound on the true median. Note that because the procedure only requires that the assignment be true within a fixed error tolerance that the previous decision being no does not automatically guarantee that the answer to this question is automatically yes. For this reason, a check is performed. In the event that the answer is no, the values of the upper and lower limits are not changed and the same median is kept. If 324 evaluated to yes, then it is known that the current estimate of the median is an upper bound. Therefore, at 326, the upper limit of the median is updated to the current estimate and the procedure proceeds through the remaining iterations.

Figure 4:
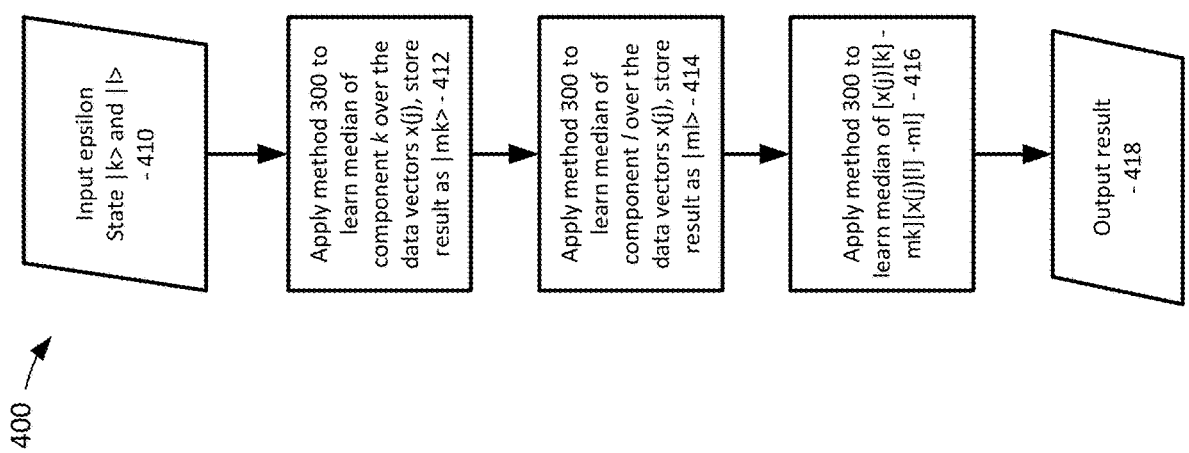
FIG. 4 is a flowchart showing an example method for finding components of a sparse robust PCA matrix.

FIG. 4 is a flowchart 400 showing an example method for finding components of a sparse robust PCA matrix. In particular, FIG. 4 is a flowchart for methods using the method of FIG. 3, or another method that has similar outputs, to compute approximations to the components of the robust PCA matrix.

At 410, the inputs of the procedure are received. In particular implementations, the inputs comprise the error tolerance epsilon and two components k, 1, which define the row and column of the element of the robust covariance matrix. The aim of the procedure is to output the requested matrix element for the robust covariance matrix within the desired error tolerance. At 412, the coherent median estimation algorithm described in method 300 is used to estimate the median over all data for component k. The number is stored in a qubit register, which is necessary to use the coherent median estimation process to find the elements of the robust covariance matrix using a quantum algorithm. At 414, the same process described in 412 is repeated to learn the median for component 1 and store the result in a quantum coherent fashion in a qubit register. At 416, the same process as in 412, coupled with an arithmetic circuit, is performed to learn the median of the product of the deviations from the median for both medians. This gives the desired component of the robust covariance matrix. At 418, the result is output, which is a qubit register encoding the median of the robust covariance matrix.

Figure 5:
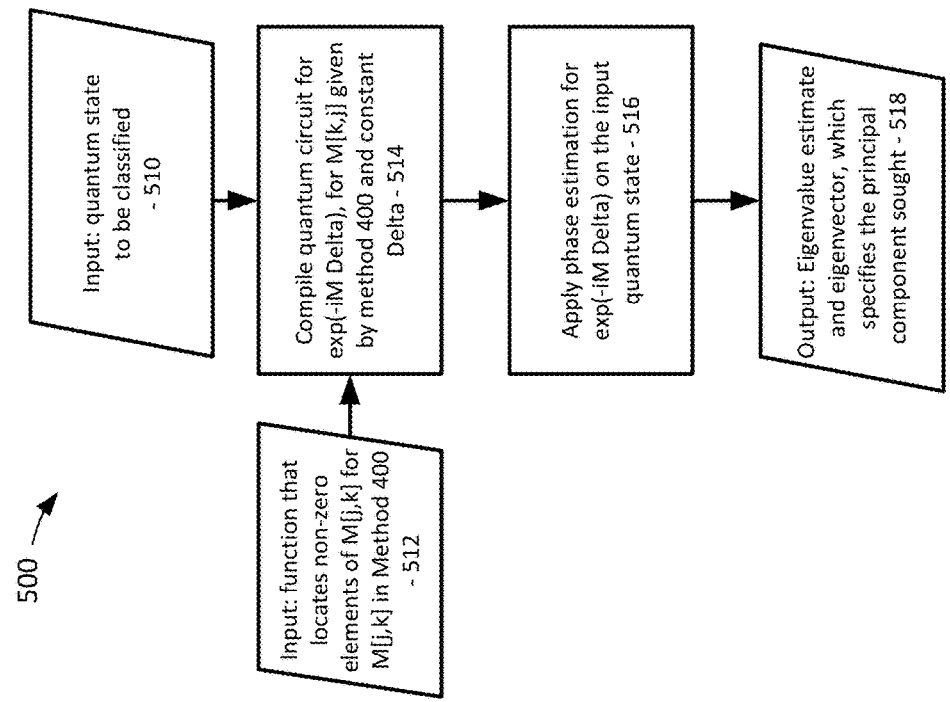
FIG. 5 is a flowchart showing a method for finding components of a sparse robust PCA matrix.

FIG. 5 is a method 500 showing a method for finding components of a sparse robust PCA matrix. In particular, FIG. 5 is a flowchart 500 for a method of how to use this subroutine within a larger algorithm to perform robust quantum PCA, which works by applying phase estimation to a vector based on the robust PCA matrix method discussed in FIG. 4.

At 510, the quantum state that the user aims to classify using robust PCA is input. At 512, the function used to identify the non-zero matrix elements of the robust PCA matrix is specified. In many cases the matrix M[j,k] may not be sparse and in such cases the function can either trivially enumerate each of the matrix elements in any given row of the matrix or approximate the matrix elements known to be small within the row to be zero and only output the column numbers corresponding to these entries. At 514, a quantum simulation algorithm is invoked to provide within a classical or quantum computer a description of the circuit that implements the matrix exponential. Such methods include but are not limited to Trotter-Suzuki methods, density matrix exponentiation, linear combinations of unitary methods and quantum walk based methods for simulation. At 516, phase estimation is invoked in order to transform the quantum state the user wishes to classify or extract features from onto to the eigenbasis of the principal-component matrix. This process is often performed coherently in general since that allows subsequent algorithms to easily estimate whether the state has high support on the directions of low or high variance of the robust PCA matrix M, however by default it will often suffice to provide the results from the phase estimation in an incoherent fashion. These directions correspond to eigenvectors of the matrix and can be used to estimate whether the datum to be classified is typical or an outlier. At 518, the results given from phase estimation are output. The eigenvalues yielded can be used directly to estimate whether the datum to be classified is typical and the eigenvectors can be used for other purposes in classification algorithms.

Figure 7:
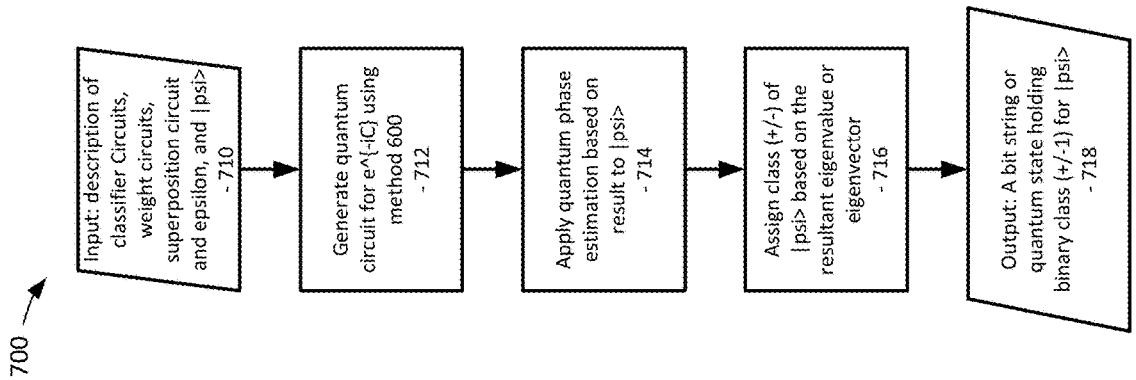
FIG. 7 is a flowchart for a phase estimation protocol to project the quantum state onto one of the eigenstates of the classifier and then from that infer the class assigned to that vector.
Figure 6:
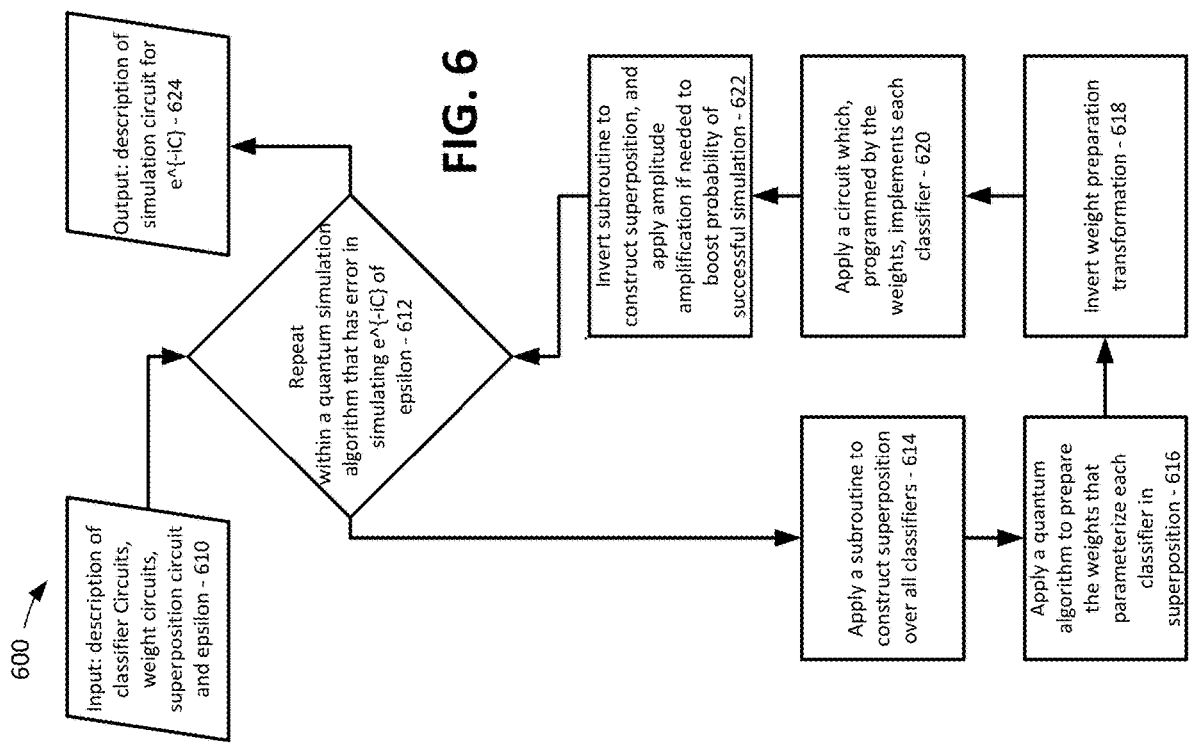
FIG. 6 is a flowchart showing an example circuit, compilation method for simulating an exponential of a bagged or boosted classifier.

FIGS. 6 and 7 are flowcharts showing example quantum boosting/bagging techniques. In particular, FIG. 6 is a flowchart 600 showing an example circuit compilation method for simulating an exponential of a bagged or boosted classifier (e.g., a quantum simulation of the boosted/bagged classifier C within this framework). The circuit built by this method is then employed within the method shown in FIG. 7. In particular, FIG. 7 is a flowchart 700 for a phase estimation protocol to project the quantum state onto one of the eigenstates of the classifier and then from that infer the class assigned to that vector.

At 610, the classifier circuits used in the ensemble classifier are specified. In a sense, one can view these subroutines as providing the weights for different classifiers that comprise the ensemble in the boosting or bagging process. These weights need not be represented explicitly as weights as per a neural network or support vector machine. At 612, an iterative loop is initiated. This loop describes the process of building an ensemble classifier using fundamental classifiers. The goal is to form an aggregated classifier out of a sum of individual classifiers that are Hermitian and unitary. The resulting aggregated classifier is then a Hermitian matrix but is not necessarily unitary so we need to use a quantum simulation method to use phase estimation to estimate the eigenvalues of the matrix. The remaining steps inside the loop construct such a unitary matrix. At 614, a subroutine is applied to build a superposition over all classifiers in the ensemble. This will typically be performed by applying a sequence of Hadamard gates but alternative realizations are possible. This step also involves preparing the appropriate superpositions over the different weights for the classifier used in a linear-combinations of unitaries quantum simulation such as, but not limited to, truncated taylor simulation approaches. At 616, in quantum superposition, the subroutine that generates the weights corresponding to each of the classifiers is applied and these weights in quantum superposition are stored with the classifier labels. The weights need not be a uniform superposition in general, but typically will be for bagging examples. At 618, ancillary qubits will often be needed in the process that instantiates the weights. This can correspond, for the example of quantum bagging, to generation of different subsets of the training data and training the classifiers coherently using the training data. Once the training process is concluded, the training data needs to be removed to save memory and maintain coherence. This step performs such a cleaning if necessary. At 620, the classifier is applied to the data in superposition. Because the classifier is programmed by the weights that are coherently stored in the quantum state this superposition in each of the branches that are controlled using ancillary qubits to implement $e^{-iC}$. Process 622 involves the probabilistic step of measurement of the qubit register in a linear-combinations of unitaries based simulation method. In ideal cases the success probability can be made arbitrarily high using oblivious amplitude amplification and by truncating the expansion for the unitary at sufficiently high order. At 624, a compiled list of all the operations needed in the quantum simulation is output as a list stored either in a quantum or classical register. This list can be used in subsequent methods to estimate the eigenvalues of C.

Turning to FIG. 7, at 710, the input to the procedure is specified, which includes the description of the classifiers and all functions needed to generate the weights for each classifier in the ensemble. At 712, a method to generate a description of a quantum circuit, stored in a classical or quantum register, that implements the exponential of C is performed. The method 600 of FIG. 6 is an example of one such method. At 714, quantum phase estimation is applied to the state to be classified and a class is returned based on the sign of the resultant eigenvector. At 716, the class of the test vector is then assigned using a function of the results from phase estimations in the previous step. The simplest such function that can be considered is the sign function that simply assigns the class+/− based on the result of phase estimation. In order to make the process more robust, this step can involve pooling results from multiple phase estimations or incorporating prior knowledge about the likely class of a vector.

At 718, the bitstring corresponding to the binary class is output. This bitstring can then be used to help train other quantum algorithms by applying gradient ascent on the success probability of this classifier for supervised learning problems.

Figure 8:
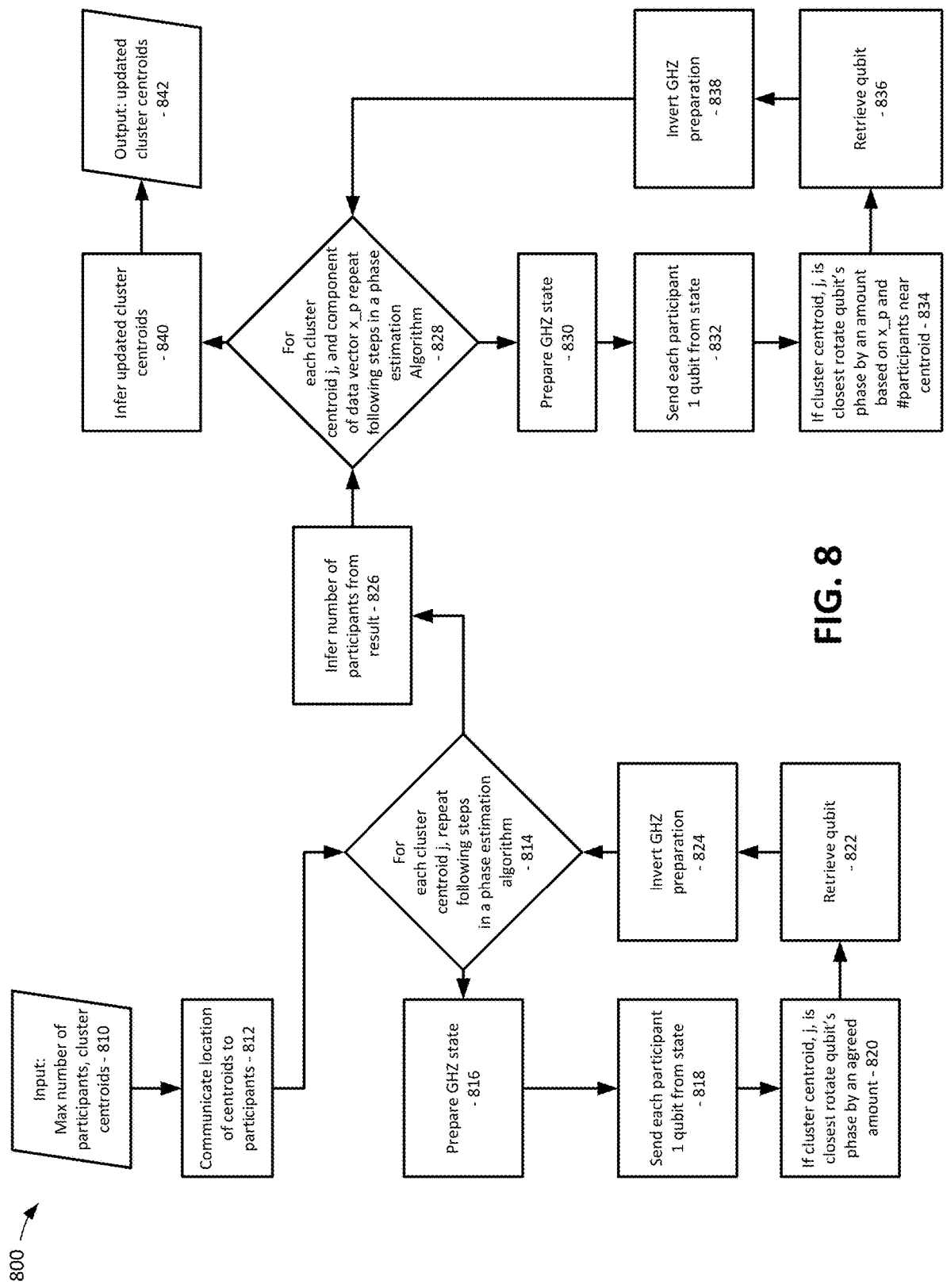
FIG. 8 is a flowchart showing a method for private quantum k-means clustering of data.

FIG. 8 is a flowchart 800 showing a method for private quantum k-means clustering of data. The example approach works in two steps wherein an entanglement based protocol is used to find the number of participants that are close to each cluster. Once this is learned a similar entanglement based protocol is used to learn the average components of the vectors assigned to each clusters. This approach is private because it is impossible to determine who is responsible for sending the information because of thus use of an entangled state and having a large number of users amplifies indetectably small rotations into a large collective rotation.

At 810, information needed to run the protocol is input, including the maximum number of participants and the number of cluster centroids used in the protocol. At 812, the protocol conveys the location of the cluster centroids to the participants. This communication can be assumed to be over a public channel, a cryptographically secured private channel or using quantum cryptography. At 814, an iterative loop is performed over all of the centroid locations for which one needs to estimate the intra-cluster variances. The steps in this process are meant to enact a phase estimation protocol, which allows the values that the experimenter needs to learn from the data to be extracted from the phase kicked back from the various participants in the algorithm. If phase estimation is not used then the information leaked in the worst possible case may be too large to satisfy the security needs of the participants. At 816, a GHZ state is prepared and distributed over the participants in the protocol. This sharing step forms the backbone of the communication protocol and allows the participants to use entanglement to convey their information in a private fashion. At 818, the GHZ state is distributed over all of the participants. At 820, the cluster label is publicly declared and the user rotates their qubit through a small-pre ordained angle if that cluster is the closest. This step is performed so that the experimenter knows how many participants are in each cluster. This will be used in the second phase of the protocol. At 822, each participant in the protocol sends their qubit back to the experimentalist using a quantum channel. At 824, the GHZ state preparation is inverted, causing the phases kicked back to revert, to a phase rotation on a single qubit. This allows phase estimation to be used in a straight forward fashion to estimate the number of participants who are nearest to each cluster and the number that did not participate. At 826, based on the statistics found, the number that participated is estimated. One such unbiased estimate can be found by computing the phases found in each step and dividing through by the rotation angle used in the protocol. At 828, a loop similar to 814 is performed except now that the protocol knows the number of participants near each cluster, that information can be used to compute the means of the data vectors in each cluster. The process used in this phase is conceptually identical to that performed in the previous phase except that the protocol loops over each feature of the data as well as each cluster centroid. At 830, as in 816, a GHZ state is prepared and distributed over the participants in the protocol. At 832, as in 818, the GHZ state is distributed over all of the participants. At 834, the users decide whether their personal data is closest to the cluster whose label has been publicly announced and then they perform a rotation of their qubit through an angle proportional to the announced component of the vector. Again these components are announced over a public channel, a cryptographically secure channel or through a channel secured by quantum cryptography. At 836, as in 822, each participant in the protocol sends their qubit back to the experimentalist using a quantum channel. At 838, as in 824, the GHZ state preparation is inverted, causing the phases kicked back to revert to a phase rotation on a single qubit. This allows phase estimation to be used in a straight forward fashion to estimate the number of participants who are nearest to each cluster and the number that did not participate. At 840, from the results of the phase estimation protocol carried out in 828, the cluster means of all k clusters are inferred. An unbiased estimate of these means can again be found using the rescaled mean of the phase estimation data that arises in that step. This step is performed on a classical computer, but optionally can be performed on a quantum computer. At 842, the inferred cluster centroids are returned as a classical bit string. These centroids can then be used in a recursive process to find a locally optimal clustering of the data provided that the number of iterations required does not invalidate the security guarantees that the users require for the protocol.

Figure 13:
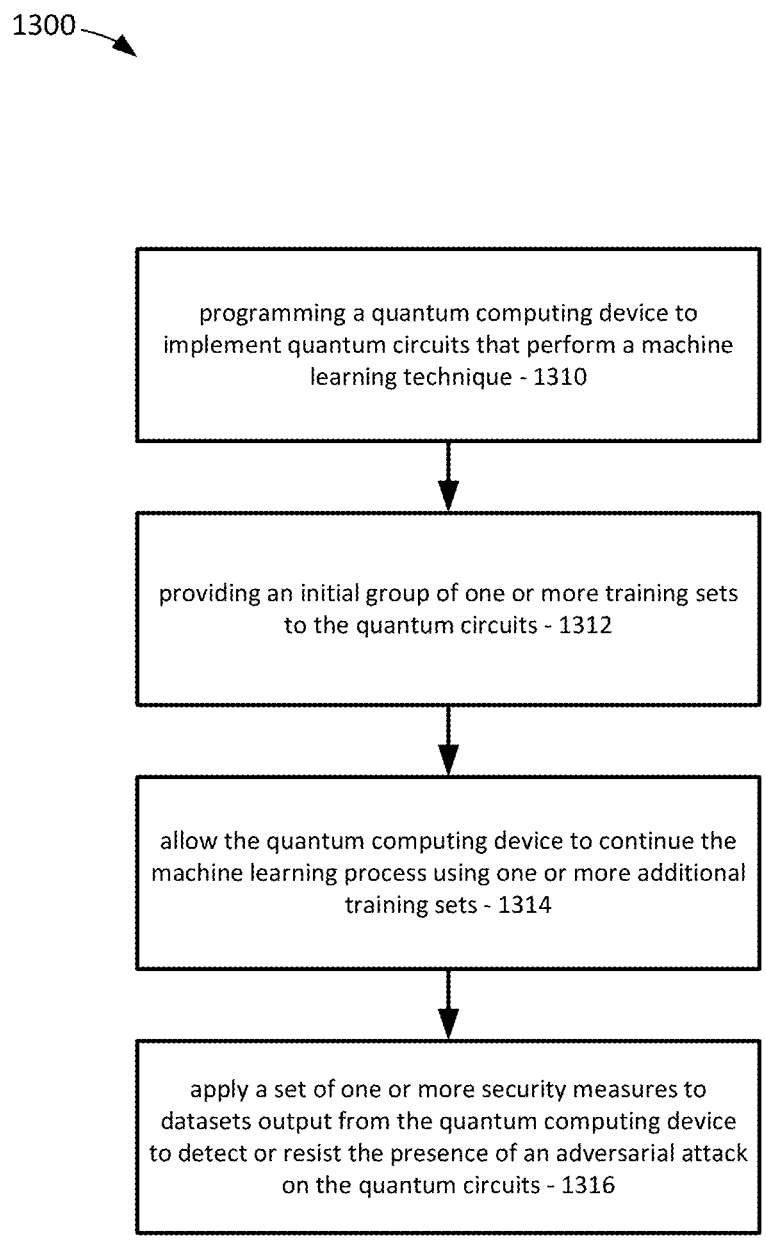
FIG. 13 is a flowchart of an example method for performing a secure machine learning technique for implementation in a quantum computing device in accordance with embodiments of the disclosed technology.

FIG. 13 is a flowchart of an example method 1300 for performing a secure machine learning technique for implementation in a quantum computing device in accordance with embodiments of the disclosed technology.

At 1310, a quantum computing device is programmed to implement quantum circuits that perform a machine learning technique. In some embodiments, the machine learning technique uses/employs principal component analysis.

At 1312, an initial group of one or more training sets is provided to (input into) the quantum circuits.

At 1314, the quantum computing device continues the machine learning process using one or more additional training sets. In particular embodiments, the additional training sets are unknown to the operator of the quantum computing device. For instance, the additional training sets can be input by a third party operator of the quantum computing device different than a first party operator that provided the initial group of one or more initial sets.

At 1316, a set of one or more security measures is applied to datasets output from the quantum computing device to detect or resist the presence of an adversarial attack on the quantum circuits. For example, the adversarial attack can comprise input to the quantum circuit of one or more adversarial training sets that corrupt a learned capability of the quantum circuits.

The security measures can be any of the disclosed security measures. For example, in some implementations, the applying the set of one or more security measure can comprise applying a robust statistic to the datasets or features of the datasets. In particular, the applying can comprise determining a median of a dataset or features of a dataset output from the quantum circuits, or applying a percentile analysis to the datasets or features of a dataset output from the quantum computing device.

Figure 14:
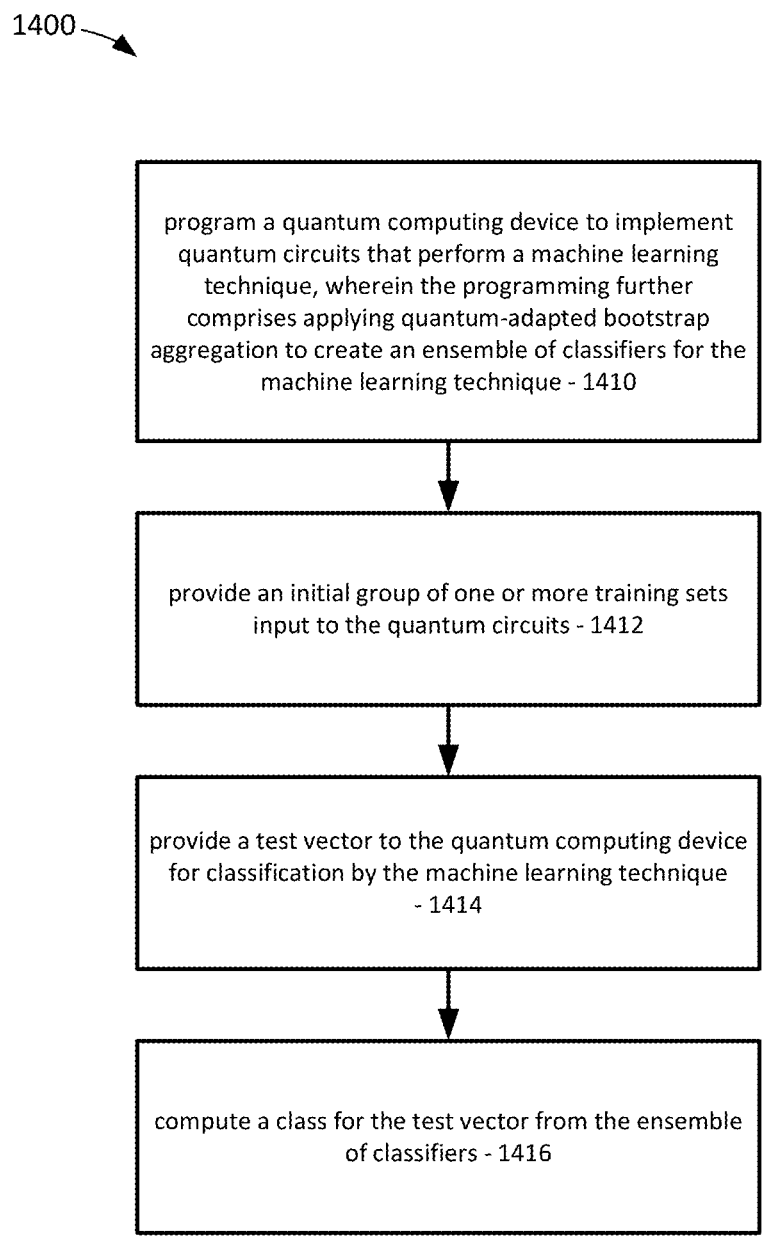
FIG. 14 is a flowchart of an example method for performing a secure machine learning technique for implementation in a quantum computing device in accordance with embodiments of the disclosed technology.

FIG. 14 is a flowchart of an example method 1400 for performing a secure machine learning technique for implementation in a quantum computing device in accordance with embodiments of the disclosed technology.

At 1410, a quantum computing device is programmed to implement quantum circuits that perform a machine learning technique. In the illustrated embodiment, the programming further comprises applying quantum-adapted bootstrap aggregation to create an ensemble of classifiers for the machine learning technique. In certain embodiments, the classifiers in the ensemble are not diagonal in the computational basis. In some embodiments, the classifiers use quantum superposition. In certain embodiments, the quantum-adapted bootstrap aggregation assumes the input states are not classical bit strings.

At 1412, an initial group of one or more training sets is provided to (input into) the quantum circuits.

At 1414, a test vector is provided to the quantum computing device for classification by the machine learning technique, wherein the test vector is unknown to the operator of the quantum computing device, wherein the test vector is input by a third party operator of the quantum computing device different than a first, party operator that provided the initial group of one or more initial sets.

At 1416, a class for the test vector is computed from the ensemble of classifiers, wherein the computing the class comprises bagging aggregates over projections of the test vector onto eigenvectors of the classifiers and outputting the class based on the aggregation.

At 1418, an adversarial attack on the quantum circuits is detected from measured changes to projections of eigenvectors of the classifiers.

Figure 15:
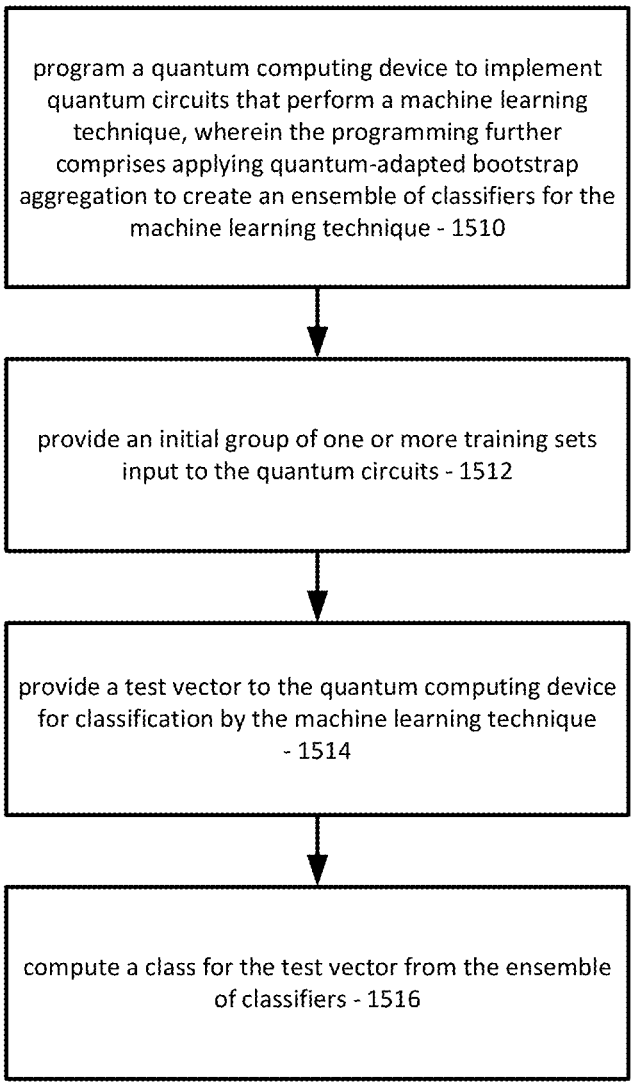
FIG. 15 is a flowchart of an example method for performing a secure machine learning technique for implementation in a quantum computing device in accordance with embodiments of the disclosed technology.

FIG. 15 is a flowchart of an example method 1500 for performing a private machine learning technique for implementation in a quantum computing device in accordance with embodiments of the disclosed technology.

At 1510, a quantum computing device is programmed to implement quantum circuits that performs a machine learning technique At 1512, the quantum circuits is trained by inputting one or more training sets to the quantum circuits, wherein the training is further performed using a clustering protocol that privatizes individual training sets provided to the quantum circuits, wherein the training is performed by combining multiple individual training sets into an amalgamated training set input to the quantum circuits, wherein the training is performed by causing rotations in the quantum circuit that result from multiple training sets, and not a single training set, and thus encode rotations that would be performed by a single training set.

At 1514, an encoded training set is generated based on at least, two or more individual training sets, wherein the training including applying the encoded training set to the quantum circuits.

VIII. Example Computing Environments

Figure 9:
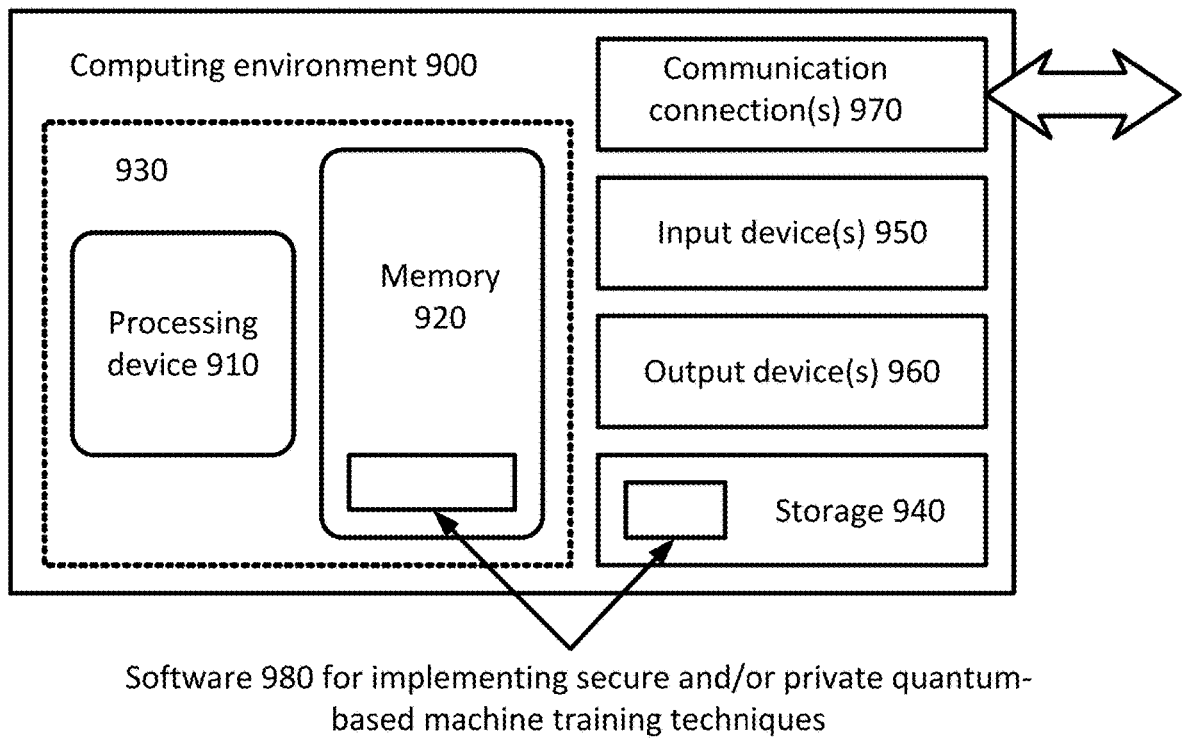
FIG. 9 illustrates a generalized example of a suitable computing environment in which several of the described embodiments can be implemented.

FIG. 9 illustrates a generalized example of a suitable computing environment 900 in which several of the described embodiments can be implemented. The computing environment 900 is not intended to suggest any limitation as to the scope of use or functionality of the disclosed technology, as the techniques and tools described herein can be implemented in diverse general-purpose or special-purpose environments that have computing hardware.

With reference to FIG. 9, the computing environment. 900 includes at least one processing device 910 and memory 920. In FIG. 9, this most basic configuration 930 is included within a dashed line. The processing device 910 (e.g., a CPU or microprocessor) executes computer-executable instructions. In a multi-processing system, multiple processing devices execute computer-executable instructions to increase processing power. The memory 920 may be volatile memory (e.g., registers, cache, RAM, DRAM, SRAM), non-volatile memory (e.g., ROM, EEPROM, flash memory), or some combination of the two. The memory 920 stores software 980 implementing tools for implementing the quantum circuit (e.g., a quantum circuit configured to perform machine learning with any one or more of the disclosed security and/or privacy measures) and/or techniques described herein.

The computing environment can have additional features. For example, the computing environment 900 includes storage 940, one or more input devices 950, one or more output devices 960, and one or more communication connections 970. An interconnection mechanism (not shown), such as a bus, controller, or network, interconnects the components of the computing environment 900. Typically, operating system software (not shown) provides an operating environment for other software executing in the computing environment 900, and coordinates activities of the components of the computing environment 900.

The storage 940 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 900. The storage 940 can also store instructions for the software 980 implementing the quantum circuit (e.g., a quantum circuit configured to perform machine learning with any one or more of the disclosed security and/or privacy measures) and/or techniques described herein.

The input device(s) 950 can be a touch input device such as a keyboard, touchscreen, mouse, pen, trackball, a voice input device, a scanning device, or another device that provides input to the computing environment 900. The output device(s) 960 can be a display device (e.g., a computer monitor, laptop display, smartphone display, tablet display, netbook display, or touchscreen), printer, speaker, or another device that provides output from the computing environment 900.

The communication connection(s) 970 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods or compilation/synthesis techniques for generating the disclosed circuits can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 920 and/or storage 940, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 10:
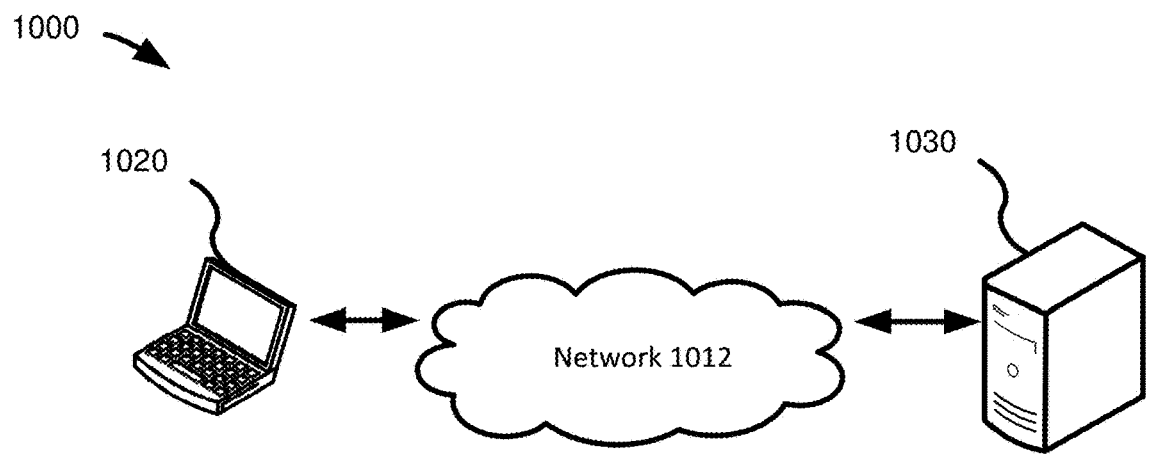
FIG. 10 is a schematic block diagram of an example of a possible network topology (e.g., a client-server network) for implementing a system according to the disclosed technology.

An example of a possible network topology 1000 (e.g., a client-server network) for implementing a system according to the disclosed technology is depicted in FIG. 10. Networked computing device 1020 can be, for example, a computer running a browser or other software connected to a network 1012. The computing device 1020 can have a computer architecture as shown in FIG. 9 and discussed above. The computing device 1020 is not limited to a traditional personal computer but can comprise other computing hardware configured to connect to and communicate with a network 1012 (e.g., smart phones, laptop computers, tablet computers, or other mobile computing devices, servers, network devices, dedicated devices, and the like). In the illustrated embodiment, the computing device 1020 is configured to communicate with a computing device 1030 (e.g., a remote server, such as a server in a cloud computing environment) via a network 1012. In the illustrated embodiment, the computing device 1020 is configured to transmit input data to the computing device 1030, and the computing device 1030 is configured to implement any of the secure and/or private quantum-based machine learning techniques disclosed herein and outputting results to the computing device 1020. Any of the data received from the computing device 1030 can be stored or displayed on the computing device 1020 (e.g., displayed as data on a graphical user interface or web page at the computing devices 1020). In the illustrated embodiment, the illustrated network 1012 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 3212 can be the Internet or a similar public network and operate using an appropriate protocol (e.g., the HTTP protocol).

Figure 11:
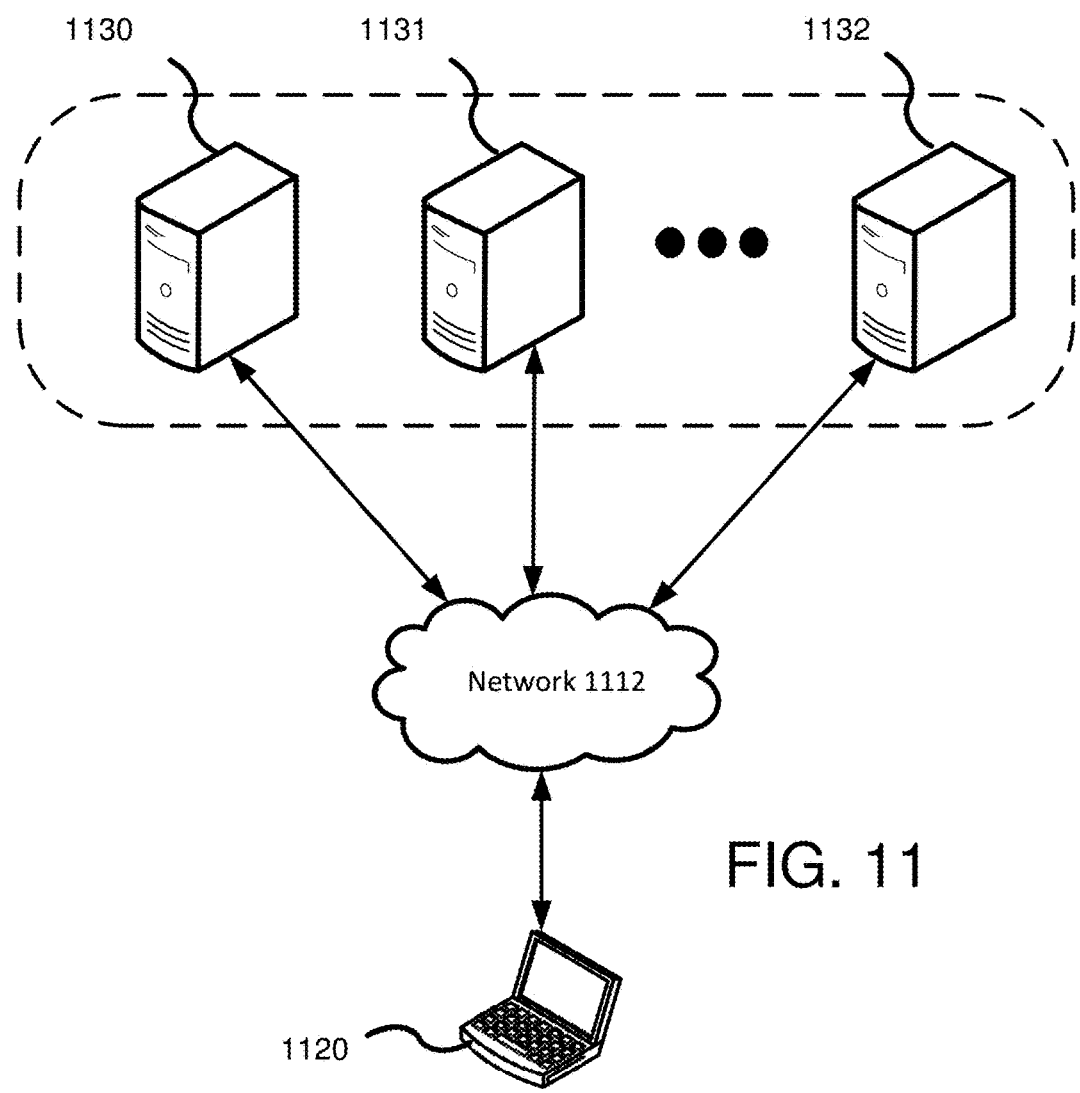
FIG. 11 is a schematic block diagram of an example of a possible network topology (e.g., a distributed computing environment) for implementing a system according to the disclosed technology.

Another example of a possible network topology 1100 (e.g., a distributed computing environment) for implementing a system according to the disclosed technology is depicted in FIG. 11. Networked computing device 1120 can be, for example, a computer running a browser or other software connected to a network 1112. The computing device 1120 can have a computer architecture as shown in FIG. 9 and discussed above. In the illustrated embodiment, the computing device 1120 is configured to communicate with multiple computing devices 1130, 1131, 1132 (e.g., remote servers or other distributed computing devices, such as one or more servers in a cloud computing environment) via the network 1112. In the illustrated embodiment, each of the computing devices 1130, 1131, 1132 in the computing environment 1100 is used to perform at least a portion of any of the secure and/or private quantum-based machine learning techniques disclosed herein. In other words, the computing devices 1130, 1131, 1132 form a distributed computing environment in which the secure and/or private quantum-based machine learning technique is shared across multiple computing devices. The computing device 1120 is configured to transmit input data to the computing devices 1130, 1131, 1132, which are configured to distributively implement any of the secure and/or private quantum-based machine learning techniques disclosed herein and to provide results to the computing device 1120. Any of the data received from the computing devices 1130, 1131, 1132 can be stored or displayed on the computing device 1120 (e.g., displayed as data on a graphical user interface or web page at the computing devices 1120). The illustrated network 1112 can be any of the networks discussed above with respect to FIG. 10.

Figure 12:
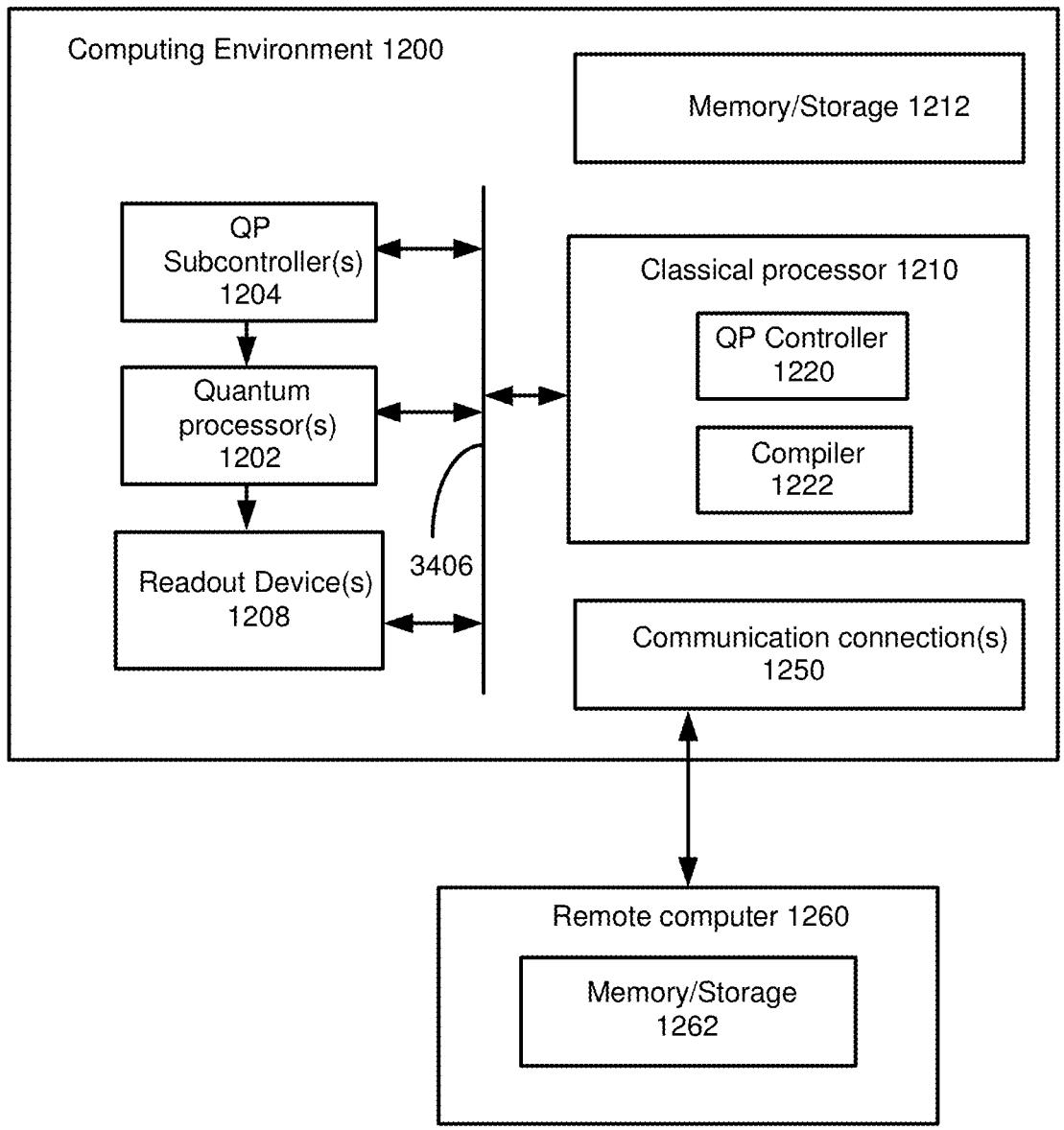
FIG. 12 is a schematic block diagram of an exemplary system for implementing the disclosed technology.

With reference to FIG. 12, an exemplary system for implementing the disclosed technology includes computing environment 1200. In computing environment 1200, a compiled quantum computer circuit description, including a circuit description for one or more quantum circuits further implementing any of the security and/or privacy procedures as disclosed herein, can be used to program (or configure) one or more quantum processing units such that the quantum processing unit(s) implement the circuit described by the quantum computer circuit description. The quantum computer circuit description can implement quantum circuits adapted to implement any of the any of the secure and/or private quantum-based machine learning techniques discussed herein.

The environment 1200 includes one or more quantum processing units 1202 and one or more readout device(s) 1208. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits comprising quantum Boltzmann machines, can be sent into (or otherwise applied to) the quantum processing unit(s) via control lines 1206 at the control of quantum processor controller 1220. The quantum processor controller (QP controller) 1220 can operate in conjunction with a classical processor 1210 (e.g., having an architecture as described above with respect to FIG. 9) to implement the desired quantum computing process. Further, the classical processor 1210 can be programmed to compile, load, and/or operate (or otherwise control) quantum circuits adapted to implement any of the any of the secure and/or private quantum-based machine learning techniques discussed herein.

In the illustrated example, the QP controller 1220 further implements the desired quantum computing process via one or more QP subcontrollers 1204 that are specially adapted to control a corresponding one of the quantum processor(s) 1202. For instance, in one example, the quantum controller 1220 facilitates implementation of the compiled quantum circuit by sending instructions to one or more memories (e.g., lower-temperature memories), which then pass the instructions to low-temperature control unit(s) (e.g., QP subcontroller(s) 1204) that transmit, for instance, pulse sequences representing the gates to the quantum processing unit(s) 1202 for implementation. In other examples, the QP controller(s) 1220 and QP subcontroller(s) 1204 operate to provide appropriate magnetic fields, encoded operations, or other such control signals to the quantum processor(s) to implement the operations of the compiled quantum computer circuit description. The quantum controller(s) can further interact with readout devices 1208 to help control and implement the desired quantum computing process (e.g., by reading or measuring out data results from the quantum processing units once available, etc.)

With reference to FIG. 12, compilation is the process of translating a high-level description of a quantum algorithm into a quantum computer circuit description comprising a sequence of quantum operations or gates, which can include quantum circuits adapted to implement any of the any of the secure and/or private quantum-based machine learning techniques discussed herein. The compilation can be performed by a compiler 1222 using a classical processor 1210 (e.g., as shown in FIG. 9) of the environment 1200 which loads the high-level description from memory or storage devices 1212 and stores the resulting quantum computer circuit description in the memory or storage devices 1212.

In other embodiments, compilation and/or quantum-based machine learning as disclosed herein (including the provision of training and/or input sets and the monitoring to detect adversarial attacks) can be performed remotely by a remote computer 1200 (e.g., a computer having a computing environment as described above with respect to FIG. 9) which stores the resulting quantum computer circuit description and/or stores software for performing any of the quantum-based machine learning techniques as disclosed herein in one or more memory or storage devices 1262 and transmits the quantum computer circuit description and/or machine learning instructions to the computing environment 1200 for implementation in the quantum processing unit(s) 1202. Still further, the remote computer 1200 can store the high-level description and/or machine learning instructions in the memory or storage devices 1262 and transmit the high-level description and/or instructions to the computing environment 1200 for compilation and use with the quantum processor(s). In any of these scenarios, results from the computation performed by the quantum processor(s) can be communicated to the remote computer after and/or during the computation process. Still further, the remote computer can communicate with the QP controller(s) 1220 such that the quantum computing process (including any compilation, machine learning, and/or QP processor control procedures) can be remotely controlled by the remote computer 1260. In general, the remote computer 1260 communicates with the QP controller(s) 1220 and/or compiler/synthesizer 1222 via communication connections 1250.

In particular embodiments, the environment. 1200 can be a cloud computing environment, which provides the quantum processing resources of the environment 1200 to one or more remote computers (such as remote computer 1260) over a suitable network (which can include the internet).

IX. Concluding Remarks

Various mechanisms for creating security and privacy in quantum computing environments are disclosed herein. For example, robust versions of quantum principal component analysis are disclosed that retain the exponential speedups observed for its non-robust analogue (modulo certain assumptions about data access and output). Quantum-specific approaches for bootstrap aggregation or boosting are also disclosed and can be performed on a quantum computer. In some cases, it is quadratically easier to generate statistics over a large number of weak classifiers using these methods. Further, quantum methods are disclosed that can be used to perform a private form of k-means clustering wherein no eavesdropper can determine with high-probability that any participant contributed data, let alone learn that data.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. A method, comprising:
    programming a quantum computing device to implement quantum circuits that perform a machine learning technique using one or more qubits of the quantum computing device, wherein the machine learning technique employs principal component analysis based on at least one median estimate stored as a quantum bit string;
    providing an initial group of one or more training sets to the quantum circuits;
    allowing the quantum computing device to continue the machine learning process using one or more additional training sets; and
    applying a set of one or more security measures to datasets output from the quantum computing device to detect or resist the presence of an adversarial attack on the quantum circuits.

2. The method of claim 1, wherein the adversarial attack comprises input to the quantum circuit of one or more adversarial training sets that corrupt a learned capability of the quantum circuits.

3. The method of claim 1, wherein the applying the set of one or more security measure comprises applying a statistic to the datasets or features of the datasets.

4. The method of claim 1, wherein the applying comprises determining a median of a dataset or features of a dataset output from the quantum circuits.

5. The method of claim 1, wherein the applying comprises applying a percentile analysis to the datasets or features of a dataset output from the quantum computing device.

6. The method of claim 1, wherein the additional training sets are unknown to the operator of the quantum computing device.

7. The method of claim 1, wherein the additional training sets are input by a third party operator of the quantum computing device different than a first party operator that provided the initial group of one or more initial sets.

8. The method of claim 1, wherein the machine learning technique is performed using rotations of at least one of the one or more qubits of the quantum computing device.

9. A system, comprising:
    a quantum computing device comprising one or more programmable qubits; and
    a classical computing device in communication with the quantum computing device, the classical computing being configured to perform a method, comprising:
        programming the quantum computing device to implement quantum circuits that perform a machine learning technique using the one or more qubits of the quantum computing device, wherein the machine learning technique employs principal component analysis based on at least one median estimate stored as a quantum bit string;
        providing an initial group of one or more training sets to the quantum circuits;
        allowing the quantum computing device to continue the machine learning process using one or more additional training sets; and
        applying a set of one or more security measures to datasets output from the quantum computing device to detect or resist the presence of an adversarial attack on the quantum circuits.

10. The system of claim 9, wherein the adversarial attack comprises input to the quantum circuit of one or more adversarial training sets that corrupt a learned capability of the quantum circuits.

11. The system of claim 9, wherein the applying the set of one or more security measure comprises applying a statistic to the datasets or features of the datasets.

12. The system of claim 9, wherein the applying comprises determining a median of a dataset or features of a dataset output from the quantum circuits.

13. The system of claim 9, wherein the applying comprises applying a percentile analysis to the datasets or features of a dataset output from the quantum computing device.

14. The system of claim 9, wherein the additional training sets are unknown to the operator of the quantum computing device.

15. The system of claim 9, wherein the additional training sets are input by a third party operator of the quantum computing device different than a first party operator that provided the initial group of one or more initial sets.

16. The system of claim 9, wherein the machine learning technique is performed using rotations of at least one of the one or more qubits of the quantum computing device.

17. A computer-readable memory device or storage device storing computer-executable instructions, which when executed by a classical computing device, cause the classical computing to perform a method, the method comprising:
    programming a quantum computing device to implement quantum circuits that perform a machine learning technique using one or more qubits of the quantum computing device, wherein the machine learning technique employs principal component analysis based on at least one median estimate stored as a quantum bit string;
    providing an initial group of one or more training sets to the quantum circuits;
    allowing the quantum computing device to continue the machine learning process using one or more additional training sets; and
    applying a set of one or more security measures to datasets output from the quantum computing device to detect or resist the presence of an adversarial attack on the quantum circuits.

18. The computer-readable memory device or storage device of claim 17, wherein the machine learning technique is performed using rotations of at least one of the one or more qubits of the quantum computing device.

* * * * *